FLUID-CONTROLLED DATA STORAGE APPARATUS

Filed Dec. 22, 1966 9 Sheets-Sheet 1

INVENTORS
CHARLES S. JACKOWSKI
DONALD F. JENSEN
HANS R. MÜLLER
MELVIN R. NOLL
ROBERT R. SCHAFFER

BY K. P. Johnson
ATTORNEY

Sept. 9, 1969 C. S. JACKOWSKI ET AL 3,466,610

FLUID-CONTROLLED DATA STORAGE APPARATUS

Filed Dec. 22, 1966 9 Sheets-Sheet 7

FLUID-CONTROLLED DATA STORAGE APPARATUS

Filed Dec. 22, 1966 9 Sheets-Sheet 8

FLUID-CONTROLLED DATA STORAGE APPARATUS

United States Patent Office 3,466,610
Patented Sept. 9, 1969

3,466,610
FLUID-CONTROLLED DATA
STORAGE APPARATUS

Charles S. Jackowski and Donald F. Jensen, Endicott, Hans R. Müller, Endwell, Melvin R. Noll, Binghamton, and Robert R. Schaffer, Endwell, N.Y., assignors to International Business Machines Corporation, Armonk, N.Y., a corporation of New York Filed Dec. 22, 1966, Ser. No. 603,972
Int. Cl. G11b *13/00*
U.S. Cl. 340—172.5 12 Claims

ABSTRACT OF THE DISCLOSURE

Buffer storage apparatus for recording and transmitting data in coded form, being particularly adapted for operation and control by pressurized fluid through the use of diaphragm-controlled logic elements. The control circuits operate by fluid pressure signals to provide for data storage, data read out, erasure, movement of the storage medium, and recording of start and end of message codes.

Portions of the material herein disclosed have been disclosed and claimed in the following copending applications: "Fluid-Operated Logic Devices," Ser. No. 384,-921, filed July 24, 1964 by R. E. Norwood, now Patent No. 3,318,329; "Diaphragm-Type Fluid Logic Latch," Ser. No. 524,166, filed Feb. 1, 1966 by D. F. Jensen; and "Fluid-Actuated Synchronizing Apparatus," Ser. No. 561,-116, filed June 29, 1966 by H. R. Müller.

A secondary effect created by advances in the data processing technology toward high-speed, low-power electrical circuits has been the increase and incompatibility between the relative low-speed, low-cost input/output mechanism requirements and their control logic. This is particularly apparent with such terminal units as printers, card readers, paper tape machines, etc., as used in communication systems. The sensing devices, electromagnets and timing and synchronization circuits generally require high power and low speed logic. This requires in many cases the adaptation of circuits for control logic which result in costs that are several times the expense of the basic mechanism.

One of the problems frequently encountered in communication systems is the mismatch in speed or "throughput" of the source or terminal equipment, the communication line and the central processor. For example, an operator working "on-line" from a keyboard transmits data at less than 10% of the available throughput rate of the line or processor. This results in inefficient utilization of the line time and a decrease of a capacity in speed of data handling at the central processor. The prime application of a "buffer" storage apparatus is to provide a facility to accumulate "off-line" data at a remote terminal and transmit it at line speed to the processor; likewise, data could be received from the central processor at line speed and subsequently batch-printed "off-line." This provides optimal use of the transmission facility and an associated increase in systems efficiency.

The speed range, functional requirements and low cost objectives of the "buffer" storage apparatus have been found to be uniquely suited to the capabilities of fluid technology and data storage tape. A variable-speed input, fixed-speed output memory built around this media requires logic, controls and means for indexing, recording and reading. Although some of these functions have been accomplished heretofore with pure fluid devices such as the pure fluid amplifier, these functions have not utilized the diaphragm control device such as that disclosed in the aforementioned Patent No. 3,318,329 to R. E. Norwood, and "Diaphragm-Type Fluid Logic Latch," Ser. No. 524,166, filed Feb. 1, 1966 by D. F. Jensen. The diaphragm devices offer a significant advantage in that the consumption of pressurized fluid is relatively low, and decreases the problem of supplying a generated fluid signal to several locations and receiving signals from several locations.

Accordingly, it is a principal object of this invention to provide apparatus for the storage of data in which storage is accomplished primarily through the operation of fluid-controlled logic devices.

Another important object of this invention is to provide fluid-controlled data storage apparatus that accepts data for storage at an asynchronous rate and transmits data during readout at a synchronous rate.

Another object of this invention is to provide data storage apparatus which is inexpensive, versatile, and employs diaphragm-type fluid logic devices for its functional control.

Still another object of this invention is to provide fluid-controlled data storage apparatus adapted to use either conventional chad tape or chadless tape as the storage medium.

Yet another object of this invention is to provide fluid-controlled data storage apparatus which has the ability to erase previously recorded data preparatory to the recording of new data.

A still further object of this invention is to provide fluid-controlled data storage apparatus which can be controlled to read out data character-by-character or in the burst mode so as to be compatible with other data processing equipment.

The foregoing objects of the present invention are attained with the use of diaphragm-type fluid logic devices as a control means for indexing, recording and sensing a data storage tape. Generally, a data storage member is driven by indexing means which can be selectively engaged for recording or sensing to move the tape. Input data signals to be recorded are transmitted to logic devices asynchronously and, upon detection at arrival, a strobe signal is generated which activates a data synchronizer circuit. The incoming data signals are then temporarily stored in a single character register until they can be applied to the record mechanism which operates on a fixed cycle time. The record mechanism is continuously being driven but is insensitive to record data until the stored input pulses are applied at the proper cycle time. Such signal application is the function of the synchronizer circuit, which operates in conjunction with the internally generated timing signals. When the waiting signals representing the input character are detected in the single character register these signals are then applied to the select mechanism of the recording means and a manifestation of that character is recorded in the tape through the actuation of punch levers. During the actuation of the levers, an additional lever is also actuated in the recording means which resets the tape to erase all data one character position before that being written. The erase means is provided only in the instance where a resusable storage medium is being used. Upon completion of recording the charcter, the index mechanism responds to an advance signal to bring the reset character area of the tape into position under the recording means preparatory to receiving the next character for storage.

The machine is provided with several additional features so as to enable the detection of the start and end of a data message. When the apparatus is placed in the record mode, means are provided to automatically reset one character position and advance the tape one position, and then record a special character indicating the start-of-message or SOM character. Upon completion of the message, an end-of-message or EOM character can be inserted by the operator and means are provided to detect the entry of this character so that the synchronizer circuit is disabled to prevent the storage of additional information. The indexing mechanism also responds to the EOM character entry and has the ability to advance the tape until the SOM character is detected at a sensing means at which time the indexing mechanism is stopped. The tape is then ready to be read out.

Data stored in the tape can be read out by placing the storage apparatus in the read mode. To insure that the data message is being read from the beginning, means are provided to prevent readout until the SOM character has been detected at the read head. Once this condition is fulfilled, then the read operation can be instituted so that the indexing means are active and the timing signals are applied to the sensing means to produce synchronous output pulses representative of the information stored. Upon detection of the EOM character, further output signals are suppressed and the index means remains active until the tape is returned to the position where the SOM character is detected at the sense head in the event that an endless tape is used. Otherwise the indexing mechanism is disengaged upon detection of the EOM character.

An additional feature is that of erasing the entire storage tape. When operating in the erase mode, indexing of the tape starts immediately and continues until a special erase character is detected.

Diaphragm-type control logic devices are used throughout the control circuits for the storage apparatus. These devices respond to the presence of high or low fluid pressure to respectively close or open a fluid path. The devices are used to then sense the fluid pressure within the path which switches between a high and low pressure which can be assigned binary values of one or zero.

The invention provides a wide range of operating speed, from substantially zero to the normal cycle speed of the mechanism. Furthermore, by using low pressure fluids such as air, the power supply can be kept inexpensive while yet performing a myriad of functions. The diaphragm devices also lend themselves to compact grouping on logic chips and the interconnections between diaphragm chips are kept to small distances.

The foregoing and other objects, features and advantages of the invention will be apparent from the following more particular description of a preferred embodiment of the invention, as illustrated in the accompanying drawings wherein.

Figure 1:
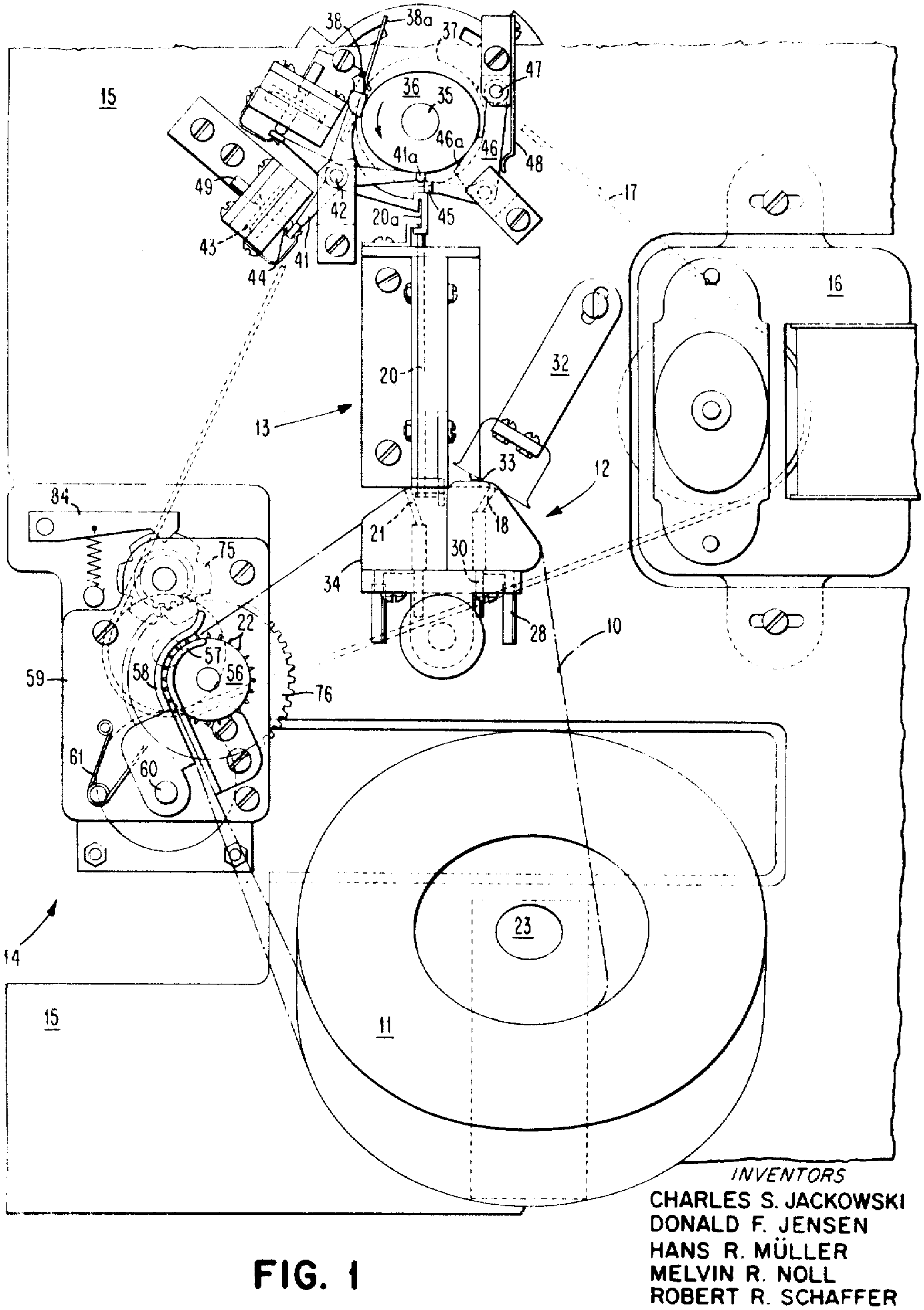
FIG. 1 is a front elevation view of the data storage apparatus in accordance with the invention.
Figure 2:
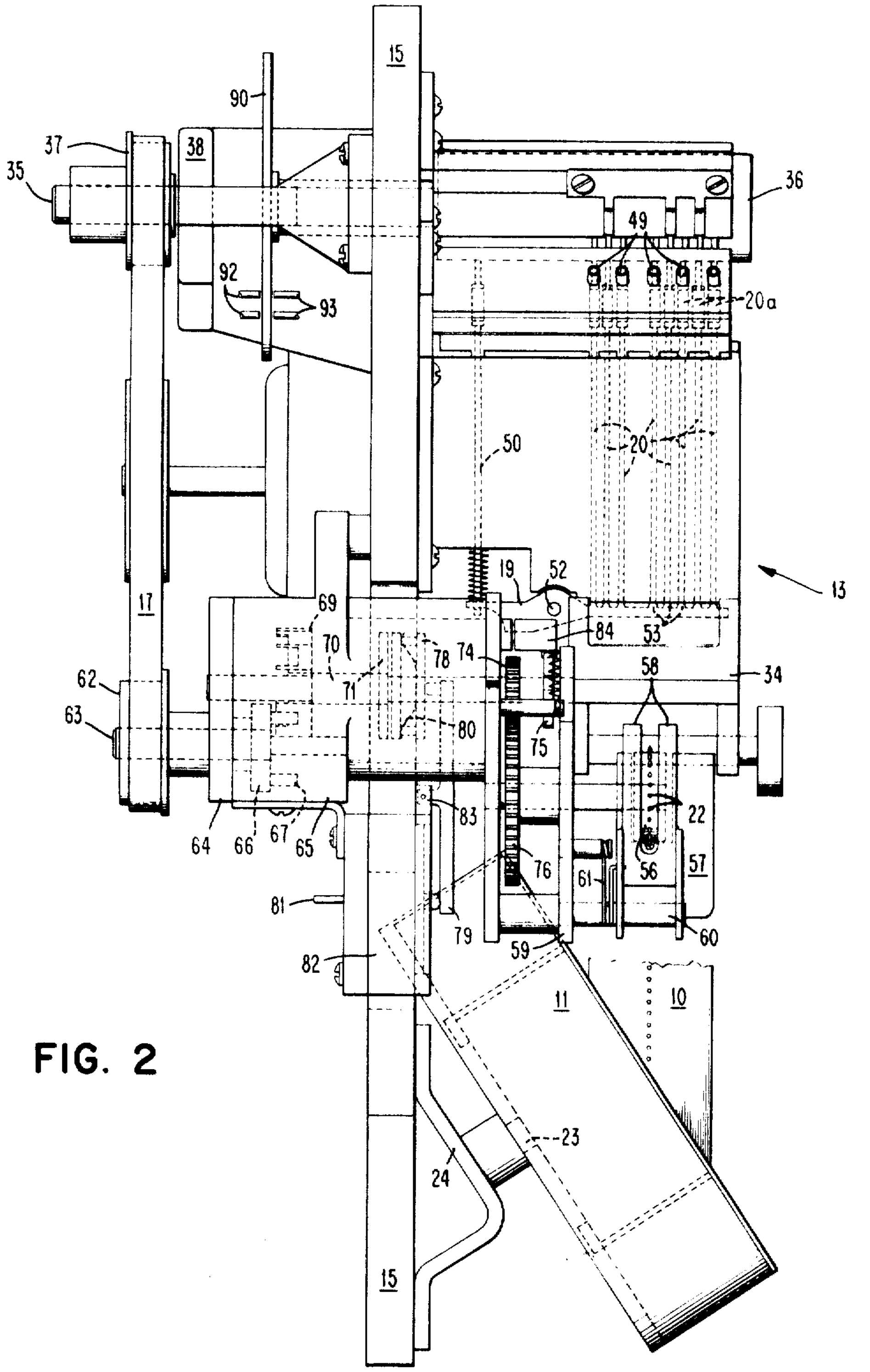
FIG. 2 is a side elevation view of the apparatus shown in FIG. 1.
Figure 4:
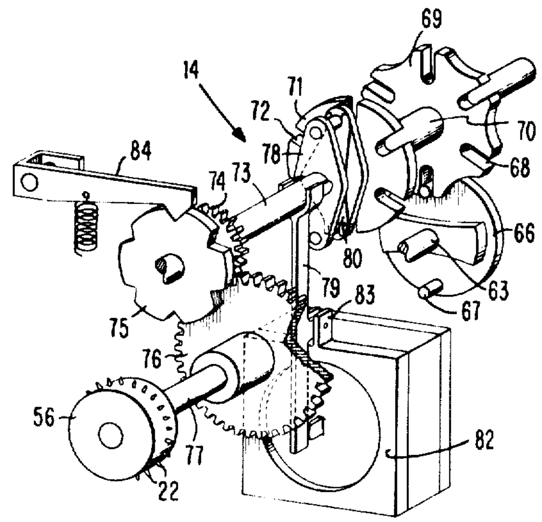
Figure 3A:
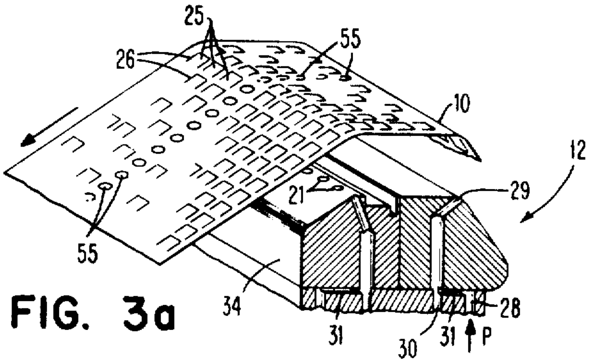
Figure 3B:
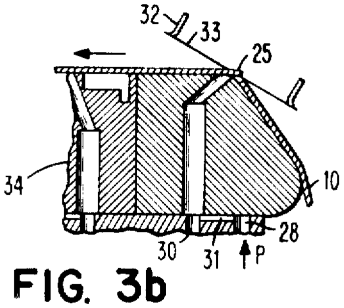
Figure 3C:
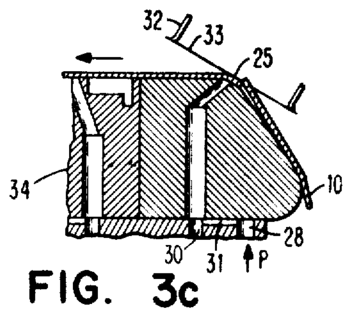
Figure 5:
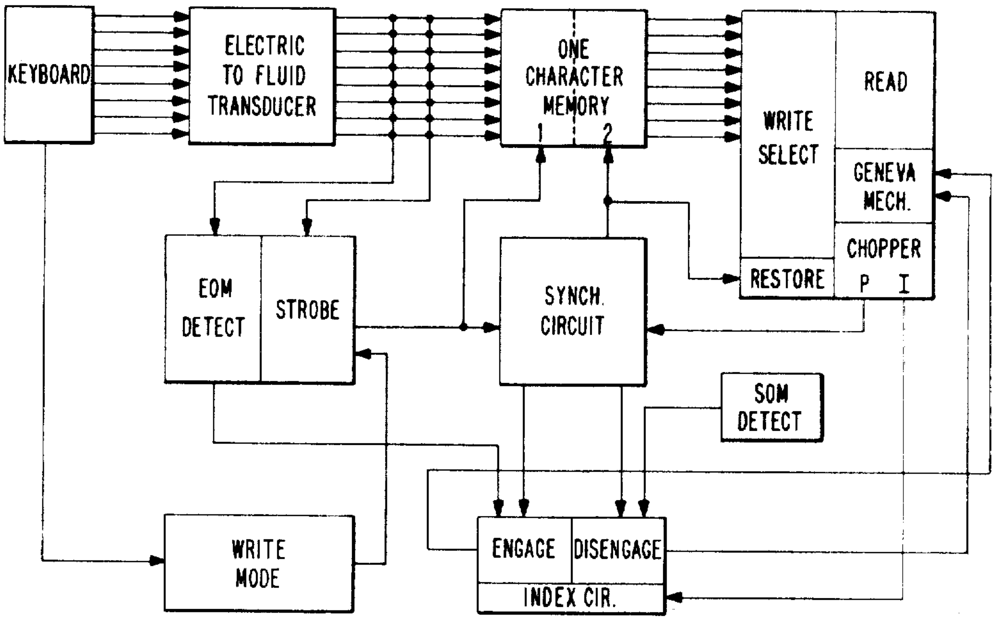
Figure 6:
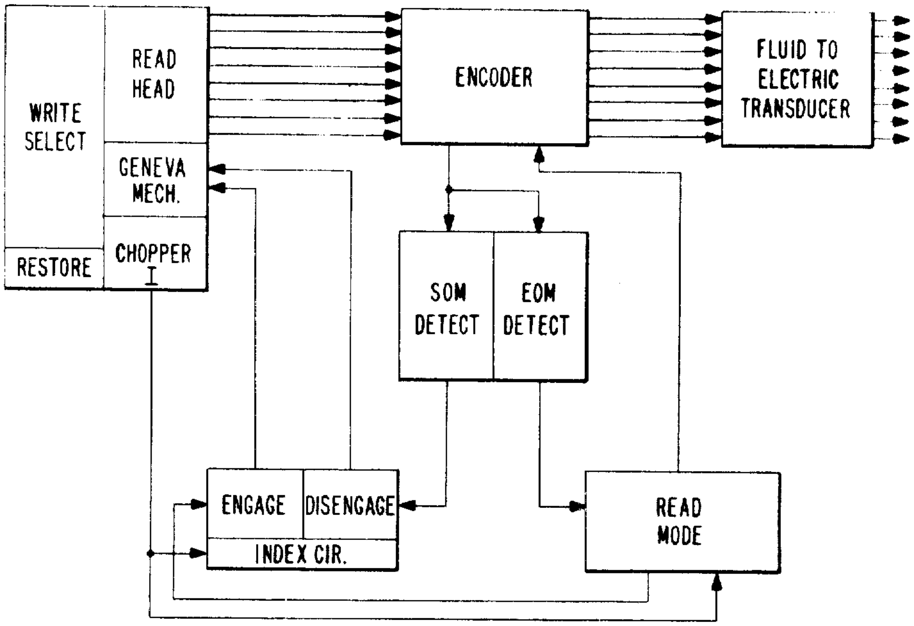
Figures 7A, 7B, 8A, 8B, 9A, 9B, 10, 11, 14, 15:
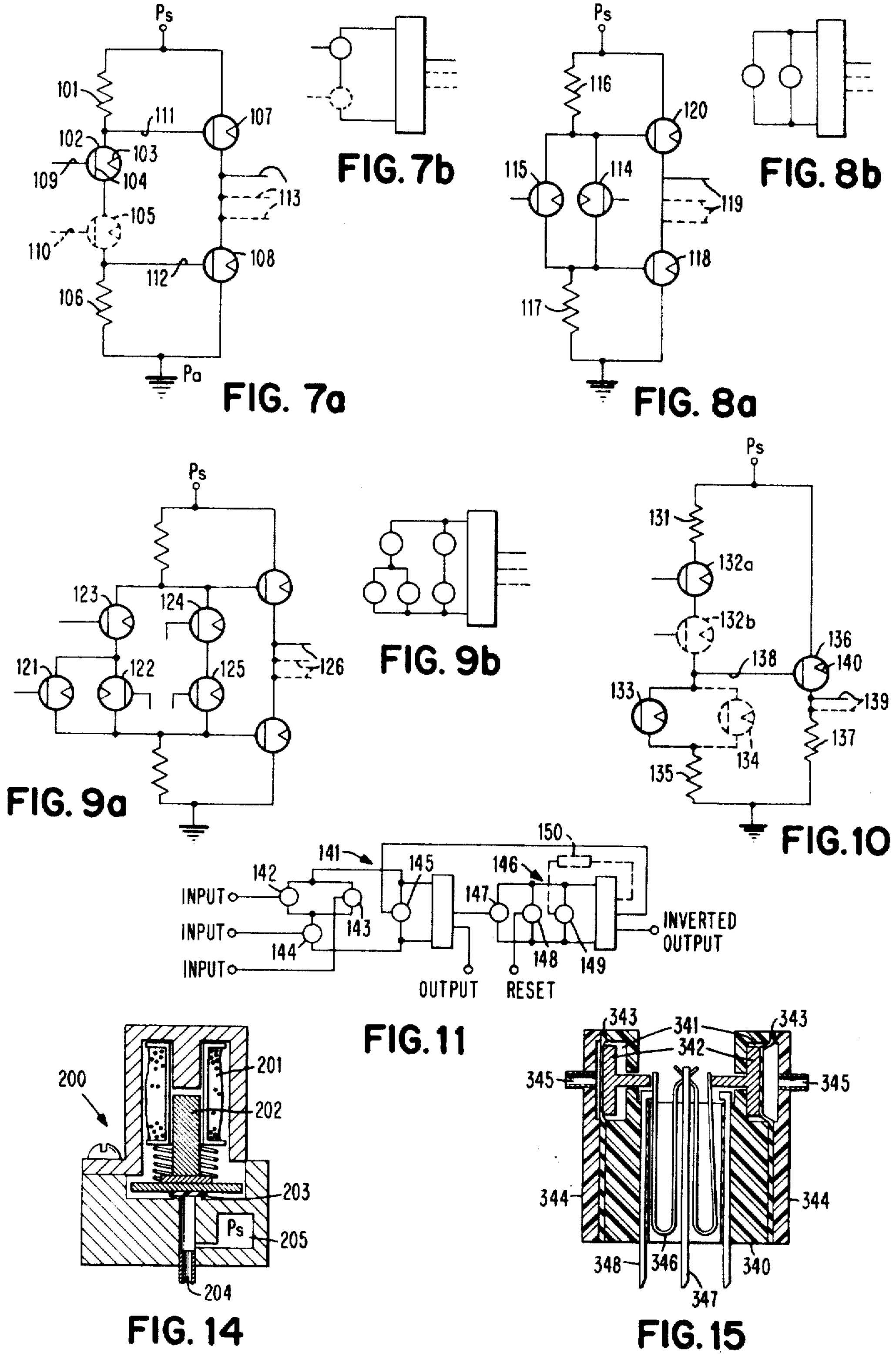
Figure 12A:
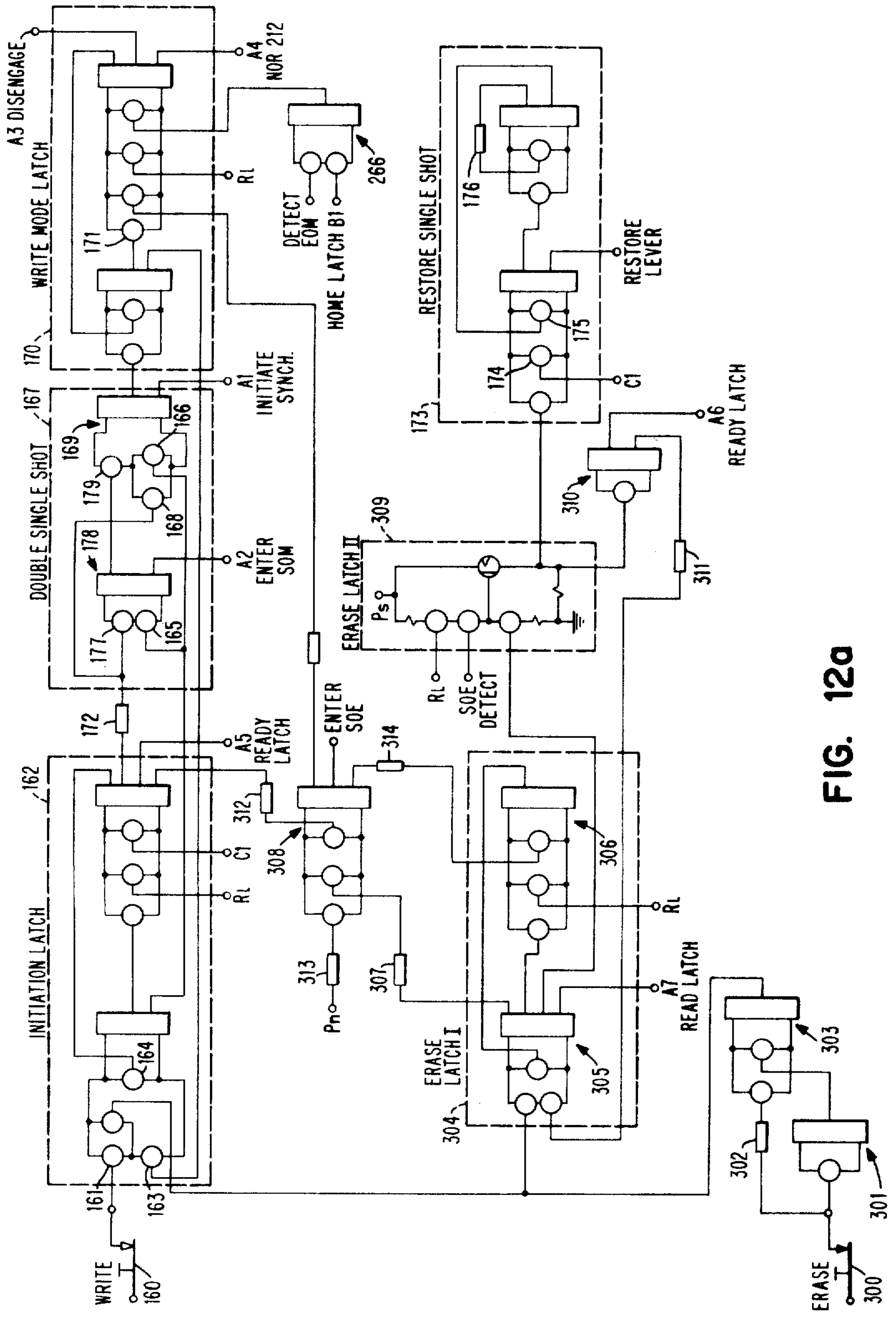
Figures 12B, 13:
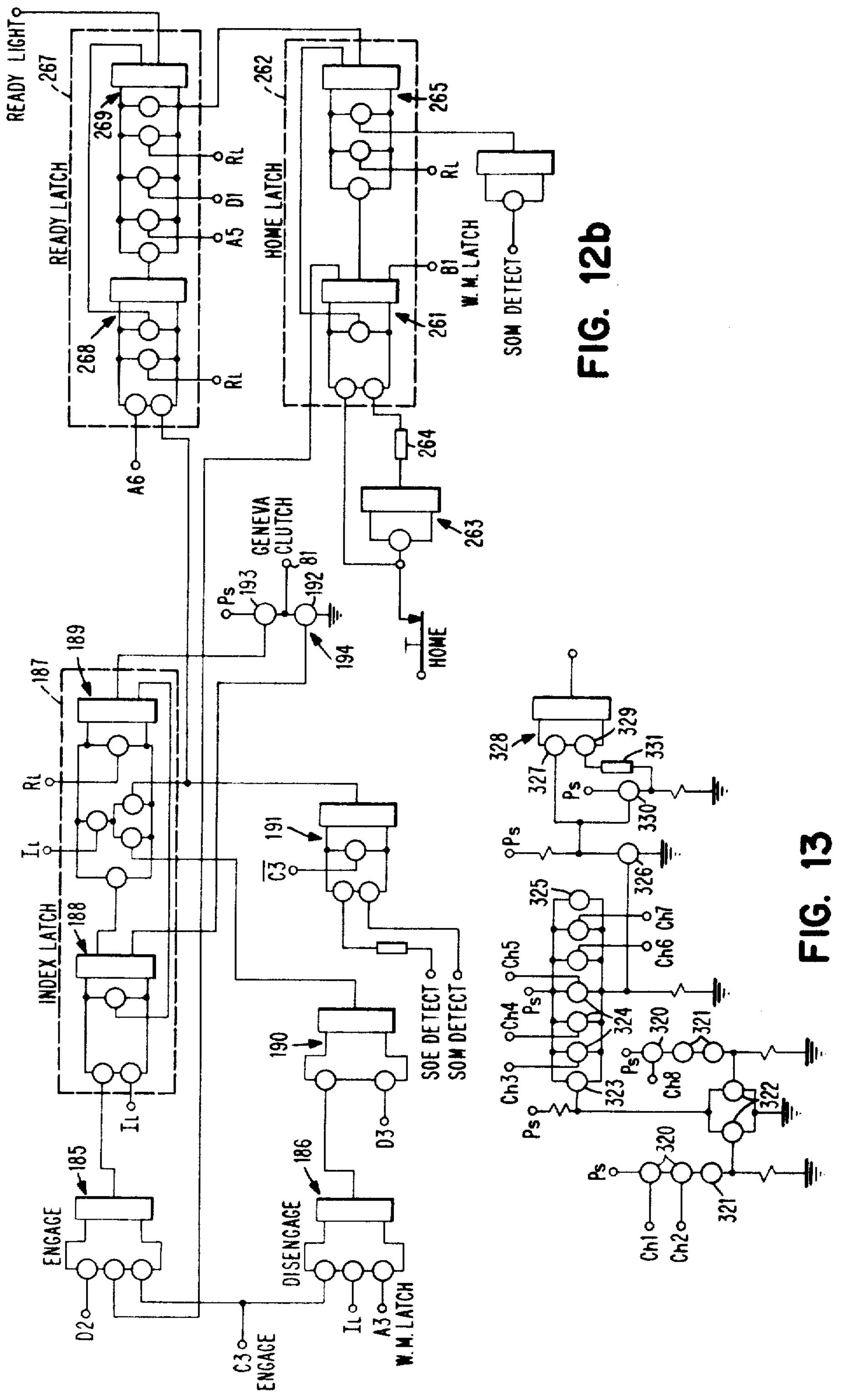

FIGS. 3*a*, 3*b* and 3*c* are sectional views of the reading head shown in FIG. 1;

FIG. 4 is a perspective view of the tape incrementing mechanism shown in FIGS. 1 and 2;

FIGS. 5 and 6 are schematic block diagrams of the recording and sensing functions for the storage apparatus;

FIGS. 7*a*, 7*b*, 8*a*, 8*b*, 9*a* and 9*b* are diagrams of the fluid pressure-operated logical NOR and NAND elements singly and in combination as constructed with diaphragm devices and used in the control circuits of the invention;

FIGS. 10 and 11 are diagrams of fluid pressure-operated latch circuits employing diaphragm control devices;

FIGS. 12*a*, 12*b*, 12*c* and 12*d* are schematic diagrams of the control circuits for the data storage apparatus of the invention;

FIG. 13 is a schematic diagram of a special character detector circuit for the storage tape in accordance with the invention; and FIGS. 14 and 15 are sectional views of electrical-to-fluid and fluid-to-electrical transducers, respectively, that may be used with the invention.

Referring to FIGS. 1 and 2, the invention comprises generally an endless data storage tape 10 housed in cassette 11, a tape sensing mechanism 12, a recording mechanism 13, and a tape indexing mechanism 14, all mounted on a supporting plate 15. Motor 16 drives the recording and indexing mechanism through a conventional toothed belt 17. By means of the common drive, the two mechanisms are kept in synchronism with each other. Tape 10 moves out from the interior of cassette 11 and passes over holes 18 of sensing mechanism 12, over the character erase lever 19 of the recording mechanism, under a plurality of recording pins 20, over a second set of sensing holes 21 used for checking purposes, and finally over the drive pins 22 of the indexing mechanism, returning to the exterior of cassette 11. Tape cassette 11 is supported on hub 23 and the hub is supported by bracket 24 on plate 15.

The sensing, recording and indexing mechanisms are each controlled by the application of pressurized fluid either continuously or as short pulses. The sensing device is more clearly illustrated in FIGS. 3*a*, *b* and *c*. In this embodiment, the invention is described as using an endless loop of reusable data tape of the so-called "chadless" type. As seen in FIG. 3*a*, chads 25 in each data position of each transverse row of positions 26 are cut loose from the tape on three sides but still attached at the fourth side. As can best be seen in FIG. 3*c*, the loosened chads are expanded in size so that they cannot return to their former positions, but must be pushed to one side of the tape or to the other with a definite application of force. Each transverse row of the chads represents a data character and the particular combination of chads being on the upper side or lower side of the tape is a character manifestation in coded form. The tape shown is an eight-channel tape, although tapes of various numbers of channels can be used. In this description, a chad on the underside of the tape, as shown in FIG. 3*c*, is considered as being in the binary "1" position and a chad pushed to the upper side of the tape is considered to be in the binary "0" position. Sensing is accomplished by applying air at a predetermined pressure, such as 1 p.s.i.g., to plenum chamber 28 in common with all sensing ports 29. An output port connects with each sensing port channel above a restriction 31. As tape 10 moves across sensing ports 29, chads 25 will be either above or below the surface of the tape. If the chad is above the tape surface, as is FIG. 3*b*, the pressurized air in sensing port 29 may escape under the chad 25 to the atmosphere, thus producing a low pressure at output port 30. If chad 25 is below the tape surface, as in FIG. 3*c*, the pressure in the sensing port channel is essentially that of the plenum chamber 28 or a high pressure, which will be detected at output port 30. The output ports 30 are each connected with a fluid actuated sensing circuit to be described hereinafter with relation to the read mode of the mechanism.

A bracket 32 supports taut wires 33 which are used at several locations across the tape breadth to hold the tape in contact with the sensing head, and thus insure that the pressurized air does not escape under the edges of the tape from the sense ports. A second sensing device 34 can be used, if desired, to check that the proper chads were set by the recording mechanism.

The recording mechanism is best seen in FIGS. 1 and 2. Shaft 35 with cam 36 secured thereto is driven continuously in the direction of the arrow by toothed belt 17 in engagement with pulley 37. The cam is elliptical and can perform two recording operations per revolution. In the position shown, a high point of the cam engages bellcrank 38 urging it counterclockwise in conjunction with a bias spring **38*a*. The opposite end of bellcrank 38 engages notch 20*a* at the top of recording pin 20, holding the pin in the retracted or upward position. An interposer operating lever 41 is pivoted counterclockwise about rod 42 whenever a fluid pressure signal is selectively applied via duct 49 to piston chamber 43 to move plunger 44 down. When end 41*a* moves up, interposer 45 is permitted to move under end 41*a*. The interposer is pivotally mounted on arm 46 which is, in turn, pivotally supported on rod 47. Spring 48 urges pad 46*a* on interposer support arm 46 into engagement with cam 35**.

Whenever end **41*a* moves up into engagement with a low point on the cam in response to a fluid signal, interposer 45 moves between end 41*a* and recording pin 20. The approaching cam high point can then urge the end, interposed and pin downward so the pin engages a tape chad. This action forces the chad through the tape and indicates thereby a binary "1" in that data position in the tape. Continued rotation of cam 35 engages pad 46*a* forcing the interposer support arm and interposer 45 from between the pin 20 and end 41*a*. During the downward movement of pin 20, bellcrank 38 was also caused to rotate clockwise, so that restoration of bellcrank 38 and pin 20 is started by cam 35** as soon as the extreme downward position is reached by the pin. Two banks of piston chambers permit close spacing of the recording pins.

Because the tape used in this embodiment is reusable, a restore mechanism is provided with which to reset the chads to their upper or "0" position thus insuring that incoming data can be recorded accurately. Chad restoration is accomplished by the operation of a restore pin 50 (FIG. 2) in the same manner as the pins 20. Pin 50 is operated each cycle in which data is recorded in the tape or if the tape is to be erased completely. Restore pin 50, when moved downward, swings restore lever 19 counterclockwise about pivot 52. Teeth 53 on the upper edge of the lever then push any of the set chads upward. From FIG. 1 it will be seen that the restore lever is placed one character position prior to the recording station so that all chads are reset immediately prior to being set.

The mechanism in FIGS. 1 and 2 also has attached thereto a slotted timing disc or chopper 90 secured for rotation with shaft 35. The chopper has cutouts 91 above its periphery. Fluid supply ducts 92 and corresponding receiver ducts 93 are arranged on opposite sides of the chopper and cutouts so that fluid pressure timing pulses of fixed relation can be generated for use with the recording, Geneva and sensing mechanisms. These pulses control the application of data signals to the buffer memory, the recording pins and clutch when data is stored, and to the clutch and readout control during tape sensing.

The record tape is advanced character position by character position through the selective operation of indexing mechanism 14 shown generally in FIGS. 1 and 2 and in detail in FIG. 4. The tape is provided with a center row of drive holes 55 (FIG. 3*a*) which engage pins 22 of drive wheel 56 of the indexing mechanism. The tape is held on the pins by passing between guides 57 and 58 (FIG. 1). Guide 57 is a stationary guide secured to a support plate 59, while guide 58 is pivotable about pin 60 and held in position by spring 61. The movable guide facilitates the threading of tape during removal and replacement.

The indexing mechanism is driven by toothed belt 17 engaging drive pulley 62 fixed to shaft 63. The shaft is supported for rotation in a pair of support plates 64, 65 and operates a Geneva mechanism. As best seen in FIG. 4, shaft 63 has a disc 66 secured thereto in which are mounted a pair of pins 67. As disc 66 rotates the pins successively engage slots 68 of Geneva disc 69 thus causing the latter to rotate incrementally. Geneva disc 69 is secured to a sleeve 70 which also has secured thereto clutch disc 71 having slots 72 therein. The sleeve is supported for rotation on shaft 73 to which is secured drive gear 74 and detent wheel 75. Gear 74 engages gear 76 which, in turn, is fixed to shaft 77 having secured thereon pin drive wheel 56. The incremental motion of Geneva disc 69 is transmitted to shaft 73 and the following elements by means of pin clutch member 78 which is axially slidable along shaft 73 by clutch operating arm 79. A spring 80 urges clutch member 78 outwardly from the slots in clutch disc 71 so that the clutch is normally disengaged.

When it is desired to engage the clutch, a pressurized fluid signal is supplied through duct 81 to move a diaphragm in cylinder 82 which pushes clutch operating lever 79 clockwise (in FIG. 4) about pivot 83. This motion engages clutch pin member 78 with slots 72 on disc 71. Member 78 is fixed on shaft 73 so that the shaft is rotated with the Geneva disc to provide the required motion for gears 74, 76 and pin wheel 56. Upon removal of the fluid pressure pulse at duct 81, spring element 80 slides pin member 78 from the slots in disc 71 thereby disengaging the clutch. A spring biased detent arm 84 rides on the periphery of detent wheel 75 and engages one of the notches therein to accurately hold shaft 73 in position when the clutch is disengaged. By applying suitable pressure pulses to duct 81, pin wheel 56 can be controlled to advance the tape as desired.

FUNCTIONAL DESCRIPTION

The data storage apparatus of the present invention can be operated in two primary models, the record or write mode and the sense or read mode. Two secondary modes of operation are the homing and erase modes.

Referring to FIG. 5, there is shown a schematic representation of those portions of the storage apparatus required for the write mode. Upon the initiation of data generation, the apparatus is placed in the Write Mode by the operation of a switch at the keyboard. The data to be stored may then be generated from any suitable source such as the keyboard and may be represented by electrical or fluid signals. If data is represented by electrical signals, a transformation must occur which is accomplished by the Electric-to-Fluid transducers. Fluid signals appear on lines going to the One Character Memory. Each line shown represents a tape channel and the particular combination of lines having pressure signals therein simultaneously represent the coded form of a single character. The first character generated is usually a special character indicating the Start-of-Message or SOM. The character generated at the keyboard cannot be stored in the Memory until an internal timing pulse has been generated, since the storage apparatus is asynchronous as far as input data is concerned. A strobe signal is generated as soon as the fluid pressure signal appears on any line from the Transducers and gates the character into the first stage of the One Character Memory. The strobe signal is also applied to the Synchronizer or Synch Circuit. The Synch Circuit gates the character into the second stage of Memory and requires a timing signal P as a second input from the timing disc or chopper on the cam shaft mentioned above. Upon the concurrence of a strobe and timing signal, the Synch Circuit produces the synchronizing signal which is applied to the second stage of the One Character Memory to gate out the character signal to the actuator of the Write Select mechanism. Any channel having a data signal thereon actuates its corresponding pin at the recording station. The Synch signal is also applied to the restore station at the punch to actuate the restore lever and reset the tape chads one character position prior to that just written. A Synch signal is also applied to both the Engage and Disengage portions of the Index control circuit to cause the advancement of the Geneva mechanism one position as described above. It will be noted that the Chopper also supplies timing signals I to the Index circuit so that the clutch of the Geneva mechanism can be operated at the proper time.

Data is thus entered in the tape one character at a time until the data message is complete. At this time the operator enters a special character indicating End-of-Message (EOM). An EOM Detector is connected to the data lines and upon detecting the entry of an EOM character, the Detector supplies a signal to the Index circuit which, in turn, continuously engages the Geneva Mechanism to advance the tape until the SOM character is detected, which was entered at the beginning of the message. Upon detecting the SOM character, the Detector initiates a Disengage signal which is applied to the Index Circuit to terminate operation of the Geneva Mechanism.

When the data storage apparatus is to be used to sense and transmit data already stored in the chadless tape, the mechanism is switched into a read mode so that the tape is advanced character-by-character over the read head. This function is illustrated in FIG. 6. At this time, it will be assumed that the tape is in the home position with the SOM character at the read head. When the Read Mode switch is actuated, a signal is sent to the Engage control of the Index Circuit upon coincidence with an index timing signal I from the Chopper; the signal coincidence then engages the Geneva Mechanism to incrementally advance the tape under the Read Head. When the read mode switch was actuated, a signal, timed by the chopper timing signal, is transmitted to the Encoder to gate data through the Encoder on each signal channel from the read head. The Encoder may or may not be required in the system, depending upon whether the code sensed at the Read Head is usable in the peripheral equipment. The encoded data may be further transmitted to the Fluid-to-Electric Transducers so that the output signals are usable in the conventional electrical form. Reading, encoding and conversion continues until the EOM character is detected which effects termination of the read mode to prevent further transmission of data from the tape. The tape, however, does not stop until the SOM character is detected at the Read Head. Upon detecting the SOM character, the signal is transmitted to the Disengage control of the Index Circuit which produces a termination signal at the Geneva Mechanism. At this time, the read mode of the apparatus is finally terminated.

FLUID LOGIC DEVICES

Before proceeding with an explanation of the fluid control circuits for storage apparatus of the invention, a brief description will be given of the fluid logic devices employed in the control circuit. These devices are shown in FIGS. 7–11. The devices generally employ diaphragm chambers in which the flow of fluid through a chamber is blocked by the closure of a flexible diaphragm against a fixed ridge within the chamber. Such devices are shown and described in the aforementioned U.S. patent application Ser. No. 384,921 by R. E. Norwood.

The devices shown in FIGS. 7*a* and 7*b* performs a logical NOR function. Pressurized fluid from supply $P_s$ flows via a duct through fluid resistance 101 which is a flow limiting orifice in the duct, through a diaphragm chamber 102 between fixed ridge 103 and flexible diaphragm 104, through a second similar diaphragm chamber 105, if present, and finally through a second fluid resistance 106 to atmosphere $P_a$ indicated by the symbol used to represent electrical ground potential. A parallel path for pressurized fluid $P_s$ is via a duct to diaphragm chamber 107, similar to chamber 102, and another duct to diaphragm chamber 108, thence to atmosphere. The second path uses no fluid resistances. Diaphragm chambers 102 and 105 are each connected to respective control ducts 109 and 110 by which control signals of pressurized fluid can be applied to push flexible diaphragm 104 against ridge 103 to block fluid flow through the chamber. Pressure signals are taken from the first path of devices 102, 105 through ducts 111 and 112 to control the operation of respective devices 107 and 108. The latter devices provide amplification and good drive capability for one or more output ducts 113. Resistors 101, 106 and the area ratios of devices 102 and 105 are selected so that the diaphragm devices snap closed at the desired predetermined control pressure level.

Assuming low pressure in both ducts 109 and 110, devices 102 and 105 are open for flow. Resistances 101 and 106 are of a size to maintain the fluid pressure therebetween at approximately 60% of the supply pressure. The pressure then is sufficient in duct 112 to close the diaphragm in device 108, but insufficient to close device 107, causing the pressure in output duct 113 to rise to the supply pressure. If a control signal is applied to either of ducts 109 or 110 to close devices 102 or 105, then the pressure in duct 111 closes the diaphragm in device 107 and the pressure in duct 112 bleeds to atmosphere so that the diaphragm in device 108 opens and the pressure in output duct 113 also falls to atmospheric pressure. Thus, a low pressure present in both ducts 109 and 110 produces a high pressure output level in duct 113. Alternatively, a high pressure in either or both ducts 109 and 110 produces a low pressure signal in duct 113. In other words, the output pressure at ducts 113 is the inverse of the input control pressures.

The schematic representation of the NOR device just described is shown in FIG. 7*b*. Input signal diaphragm devices are shown as circles and the NOR may have one or more diaphragm devices similar to 102, and one or more output ducts 113 may be present as indicated by dotted lines. It will be noted that if the first fluid path contains but a single device 102, the arrangement then performs the function of an inverter since the inverse of any pressure level applied at the control duct 109 will appear at output duct 113.

The logical NAND function is obtained with the device shown in FIGS. 2*a* and 8*b*. This device is similar to the NOR device just described except for the arrangement of two control diaphragm devices 114 and 115 in parallel between the two fluid resistances 116 and 117. When no control signals are present at devices 114 and 115, then device 118 is closed so that a high pressure signal appears at one or more output ducts 119. Because of the parallel arrangement, both devices 114 and 115 must have high control pressure signals applied thereto and be closed before device 120 will close to produce a low pressure output signal at ducts 119. This arrangement requires the presence of two coincident control signals before a change in pressure will occur at the output duct. It will be noted that the resulting output from duct 119 is the inversion of the two control signals and that there may be additional diaphragm devices in parallel with devices 114 and 115.

The logical device of FIGS. 9*a* and 9*b* is merely an illustration of one of the complex logical functions available with the combination of various OR, NOR, AND and NAND arrangements. The device is generally similar to the NAND of FIG. 8, having two primary flow paths, both of which must be blocked before a low pressure is experienced in the output ducts. In the first paths, devices 121 and 122 form an AND arrangement in that both must close to block the path; however, the entire path performs an OR function in that device 123 can alone close the path. Hence, input signals to both devices 121 and 122 or to only device 123 terminate flow in the first path. The second path is merely an OR arrangement since signals to either device 124 or 125 will close the path. No decrease in fluid pressure occurs at the output ducts 126, however, until both paths are closed so that the logical function performed by the arrangement shown is that of NAND or inverted AND.

A latch arrangement of diaphragm devices is shown in FIG. 10. The first fluid path comprises a duct from supply $P_s$, through resistance 131, diaphragm devices **132*a* and 132*b* in series, parallel devices 133 and 134, and resistance 135. The second path comprises a duct from supply $P_s$ through single diaphragm device 136 and resistance 137. Duct 138 connects the first path to device 136 and output pressure levels are produced in ducts 139. Diaphragm device 136 differs from the other devices in that ridge 140** is located upstream a predetermined distance from the center of the diaphragm. This latch is similar to that described in the aforementioned U.S. patent application, Ser. No. 524,166 by D. F. Jensen.

Assuming a control signal is present closing either of devices **132*a* or 132*b*, leaving devices 133 and 134 open, atmospheric pressure exists in duct 138** so that device 136 is open and a high pressure level exists in output ducts 139. If the control input in device 132 is now removed, no change occurs in device 136 because pressure on the ridge side of the diaphragm is essentially at the supply pressure and the pressure on the opposite side of the diaphragm is approximately 60% of the supply pressure. Furthermore, if either device 133 or 134 is closed, still no change will occur in device 136. However, when devices 133 and 134 are both closed while devices 132*a*, 132*b* are open, the pressure in duct 138 will assume that of the supply closing the diaphragm against ridge 140 because of the slightly lower pressure on the ridge side of the diaphragm, due to the continued pressure drop across resistance 137. At this time, the output pressure level in ducts 139 will decrease to atmospheric or low pressure. Once device 136 is closed, the control signals on either or both of devices 133, 134 may be removed and device 136 will remain closed. This results from the fact that pressure in duct 138 will return to approximately 60% of the supply pressure and act on the entire area of one side of the diaphragm in device 136 while the supply pressure acts only on a minor portion on the opposite side of the diaphragm upstream from ridge 140. In this condition, a low pressure signal exists in ducts 139 until device 132 is closed so that pressure in duct 138 becomes atmospheric and the supply pressure acting on the minor area of the diaphragm is able to move the diaphragm away from ridge 140. At that time the output pressure level in ducts 139 will rise to the upper limit. This latch exhibits a hysteretic effect and is referred to as a hysteresis latch herein.

Another latch arrangement used in the fluid control circuits is that shown in FIG. 11 composed of a pair of NAND Logical devices. NAND device 146 has diaphragm control chambers 142, 143, 144 and 145 while NAND device 146 has diaphragm control chambers 147, 148 and 149. The output signal of NAND 141 is applied to input chamber 147 of NAND 146 and the output signal of NAND 146 is applied to an input chamber 145 of NAND 141. For operation, assume that all inputs of NAND 141 are high pressure blocking chambers 142–145. Due to the inversion of the high pressure inputs, the output of NAND 141 is low and maintains chamber 147 open. Chambers 148 and 149 are also assumed closed. With chamber 147 open, the output of NAND 146 is a high pressure which is fed back to block chamber 145.

The latch will remain in this state until changed by applying low pressure signals to chambers 142 and 144 or to 143 and 144 to change the output of NAND 141 to a high pressure. A high pressure closes chamber 147, and with chambers 148 and 149 closed, the output of NAND 146 will be low, which is fed back to open chamber 145 and maintain the new state. This state continues until either the open chambers of NAND 141 are closed or until a low pressure reset signal is applied to chamber 148. Such will reverse the output pressures.

This latch arrangement can be optionally modified for use as a Single Shot by feeding back the output of NAND 146 to itself through a volume delay 150 shown in dotted line connected to chamber 149. The size of the volume used varies the delay before automatic reset occurs so that signal duration can be regulated. For example, if the output of NAND 146 is low, chamber 149 will open after a predetermined delay and switch the output to a high pressure. It will be noted that the input signals at NAND 141 must have returned to a high level in the meantime to block chambers 142–144 to prevent oscillation. In the following description, the arrangement and number of control chambers will vary slightly, but the latch or single shot function will remain the same.

DETAILED LOGIC DESCRIPTION

(A) Write Mode

The control logic for the storage apparatus is shown in FIGS. 12*a*, 12*b*, 12*c* and 12*d*. At the outset it should be noted that the control functions are timed with two sets of timing signals designated Punch (P) and Index (I) signals, each generated from the chopper disc 90 on cam shaft 35 of FIG. 2. The signals of each set are passed through either one or two inverters to provide both high and low pressure signals as may be required. Punch signals are designated either P*h* or P*l* and the index signals are designated either I*h* or I*l* to indicate whether the timing signal is a high level or low level pressure signal. Reset signals (R) are used to insure at the start of operation that the latches are in the proper state and are likewise designated R*h* or R*l*.

Operation in the write mode is begun by depressing Write key 160 (FIG. 12*a*) which, like all keys when depressed, opens a duct to produce a low pressure signal. The low pressure opens a normally closed control chamber 161 in the first stage of Initiation Latch 162. Control chamber 163 is an interlock that may be assumed open at this time; this chamber would be closed if the apparatus were already in the write mode. Chamber 164 is the latch feedback and is closed. When the Write key is depressed, the left NAND stage of the Initiation Latch switches to produce a high pressure output to close one control chamber of the second NAND stage and to close chambers 165 and 166 of Dougle Single Shot 167.

The purpose of the Single Shot is to provide two successive timed signals in response to the Initiation Latch signal for restoring the chads in one tape character position and provide a Write Mode interlock, and then to advance the tape one position for recording an SOM character. Normally chamber 168 of NOR 169 is closed because of the high pressure output from the right-hand stage of the Initiation Latch before switching. Thus, when chamber 166 is also closed by the Initiation Latch signal, NOR 169 produces a low pressure output. The low pressure output is applied to Write Mode Latch 170 and from output terminal A1 to the synchronizer circuit of FIG. 12*c*. Latch 170 provides an interlock to prevent activating the Write key when the storage apparatus is already in the Write mode. The low pressure input signal causes the left-hand NAND of latch 170 to provide a high pressure output which is supplied to the right-hand NAND at control chamber 171. The latter NAND produces a low pressure output, in turn, which is fed back to maintain the latch in the switched condition, and provides low outputs A3 and A4 to serve as gating signals in FIGS. 12*b* and 12*c*. The output signal from the left-hand NAND of latch 170 is applied to block control chamber 163 of Initiation Latch 162 and thereby prevent any effect being given to continued or repeated depression of Write key 160. Latch 170 remains in the set condition until reset by either the Start-of-Erase (SOE), EOM, R*l* or output B2 from the Home Latch on FIG. 12*b*.

Returning now to NOR 169 (FIG. 12*a*), the low pressure output continues until control chamber 168 is opened by the low pressure signal from volume Delay 172. The effect of switching of the right-hand NAND of the Initiation Latch from a high to low pressure was delayed by Delay 172 to establish a pulse length from NOR 169. Thus when the low pressure signal propagates through the delay, chamber 168 is opened to terminate the high pressure output from NOR 169. The output A1 is applied to synchronizer circuit in FIG. 12*c* to be described subsequently. At this point it is sufficient to assume that the synchronizer circuit produces in response to signal A1 a low pressure signal C1 which is applied to set Restore Single Shot 173 and to reset Initiation Latch 162, both in FIG. 12*a*. The synchronizer circuit also produces a signal C3 described below that activates the index mechanism to advance the tape one increment.

When signal C1 is applied to control chamber 174 of the Restore Single Shot, the normal low pressure output is switched to a high pressure output from the lefthand NAND that actuates restore pin 50 in FIG. 2 to move restore lever 19 up and push the chads to the upper side of the tape. The high level NAND output is also supplied to the right-hand NAND causing the NAND to switch and produce a low pressure feedback signal to chamber 175 causing the Single Shot to latch up. The latch-up is temporary, however, because the low feedback signal is also applied to the right-hand NAND through Delay 176. After a fixed delay, the latter NAND switches to a high pressure output causing the left NAND to produce a low output terminating the signal to the restore lever. Signal C1 in the meantime has been terminated. At this point, one character position has been reset in the tape and the tape is advanced one position to the recording station where an SOM character can be set in the tape.

Figure 12C:
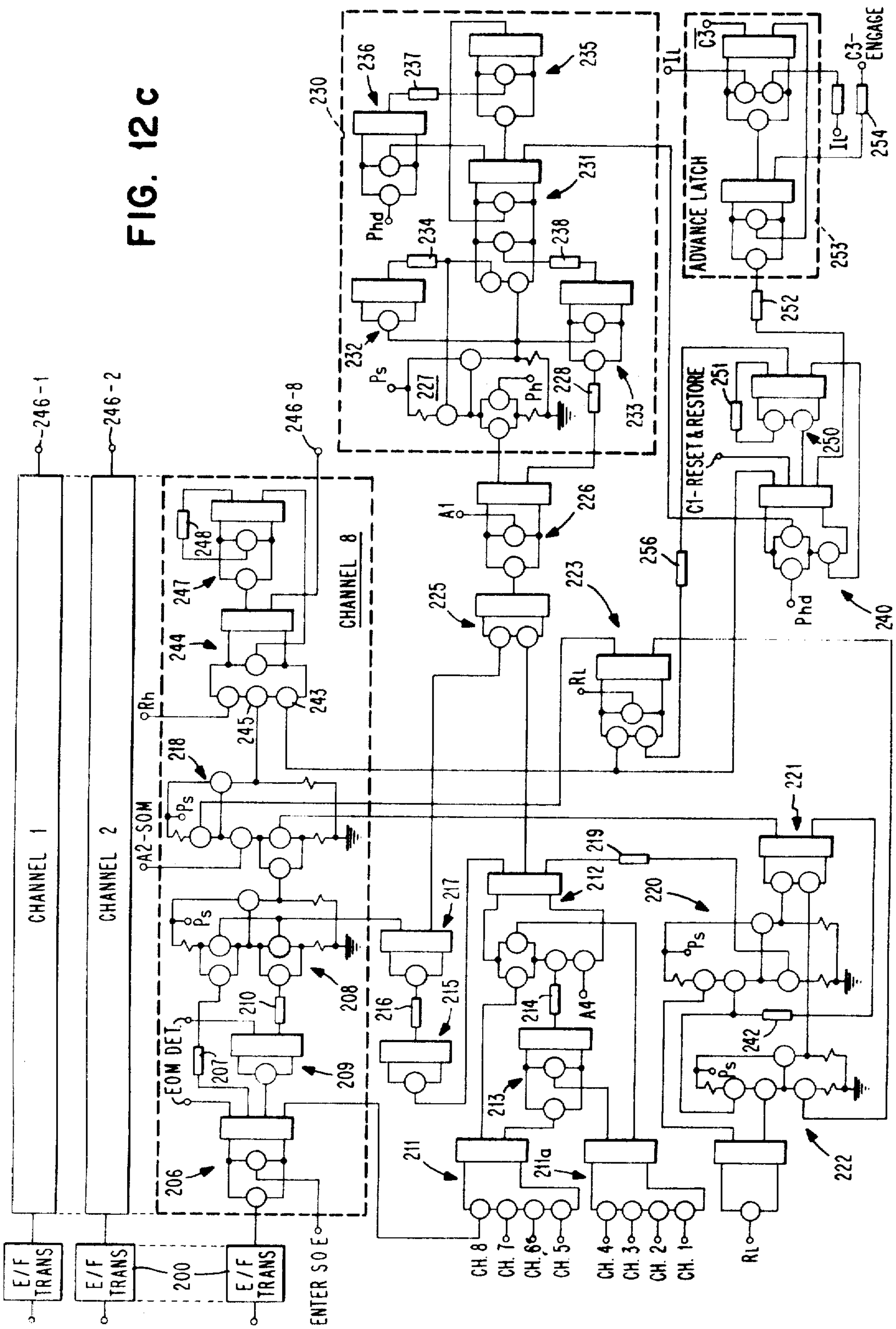

When Initiation Latch 162 is reset by low pressure signal C1, latch 162 switches to provide a low output to chambers 165 and 166 and a high pressure signal eventually, after a delay, to chamber 177. However, chambers 165 and 177 are both open concurrently before the delayed signal is effective so that NOR 178 produces a high pressure output signal A2. Signal A2 is applied to selected ones of the input data channels of FIG. 12*c* to write the special Start-of-Message (SOM) character in the tape, as will be described hereinafter. The output of NOR 178 also closes chamber 179 of NOR 169 causing it to produce a second low level signal A1. This signal, through the synchronizing circuit of FIG. 12*c*, provides another actuating signal C1 for the restore lever at Restore Single Shot 173 (FIG. 12*a*) and another actuating signal C3 for the indexing mechanism (FIG. 12*b*), as described above. Signal A1 is terminated when the high pressure passes through Delay 172 (FIG. 12*a*) to block chambers 177 and 168. Since chambers 179 and 166 are then open, NOR 169 returns to a high level output signal. In summary, the energization of the Write key and Initiation Latch activates Double Single Shot 167 which produces a first output to set an interlock latch, to restore the chads in one tape position, and to activate the indexing mechanism to move the tape one character position. The Double Single Shot then produces signal A2 which controls recording pins 20 to set certain chads below the tape, as required, to record the SOM character. The Single Shot thereafter produces another output signal A1 which repeats the restoration and advance functions so that data can now be entered in the next character position on the tape.

Figure 12D:
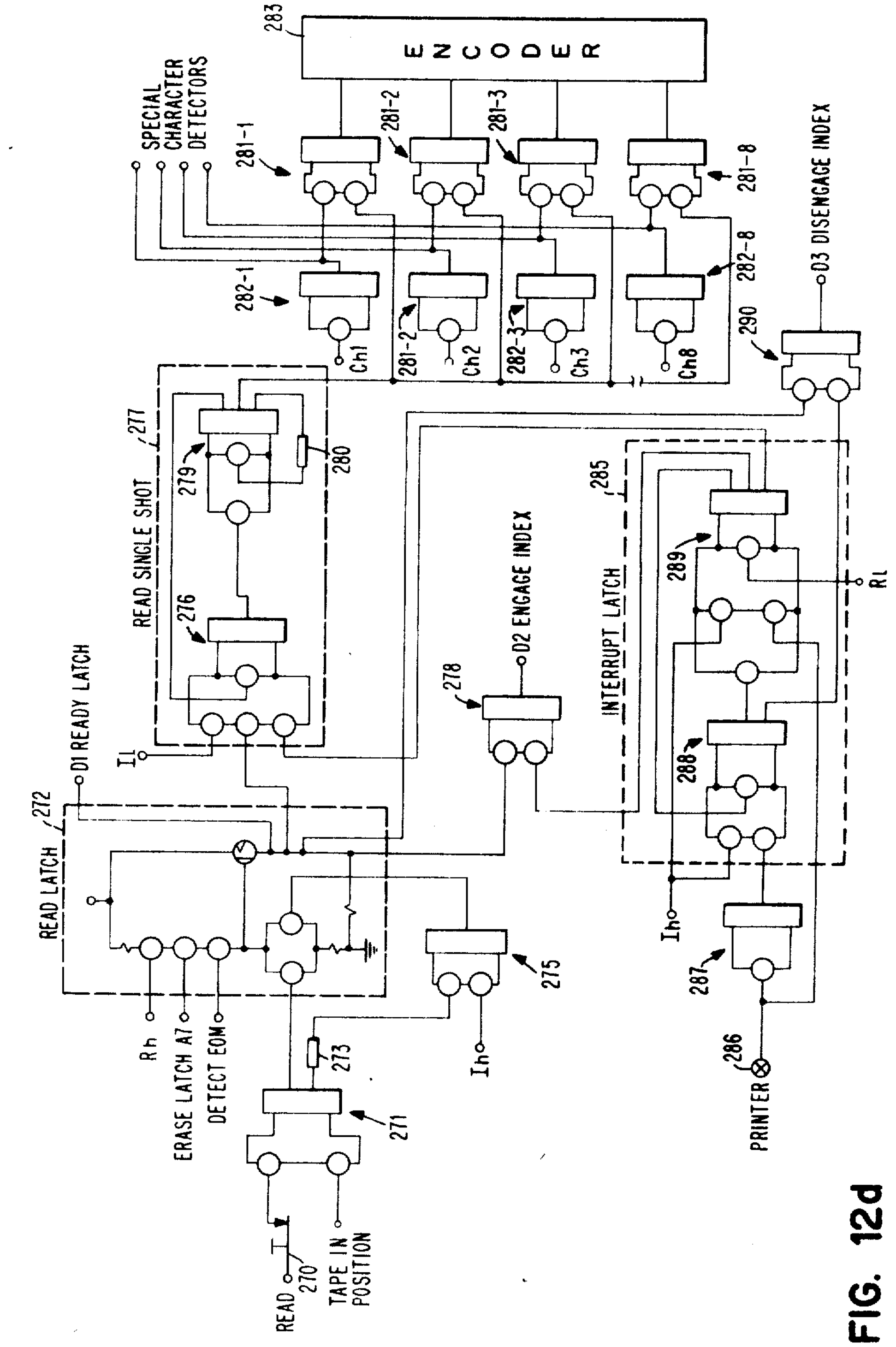

The indexing circuit is shown in a portion of FIG. 12*b* and comprises generally Engage NOR 185, Disengage NOR 186 and Index Latch 187. The control chambers of Engage NOR 185 are each normally open so that the NOR out put is at a high pressure level. NOR 185 is switched to a low pressure output by the presence of any one of three high inputs, by signal C3 from the synchronizing circuit when in the Write Mode (FIG. 12*c*), by a signal from the Home Latch 262 when in the Home Mode (FIG. 12*b*), or by a signal from NOR 278 when in the Read Mode (FIG. 12*d*). At the occurrence of one of these signals, the output of NOR 185 changes to a low pressure that is applied to Index Latch 187 as an Engage signal. The Engage signal is ineffective, however, to set the latch until a low pressure cyclical Index timing pulse I*l* occurs concurrently therewith. Latch 187 is then set so that the output of NOR 188 goes high and NOR 189 goes low; these two outputs are supplied to respective control chambers 192 and 193 of amplifier 194. The Geneva clutch output from 194 actuates the diaphragm control of the Geneva mechanism to engage pin member 78 with slots 72 (FIG. 4). The Latch 187 remains set until reset by a low pressure signal from either NOR 190 or from NOR 191 in conjunction with a low Indexing timing signal I*l* at NOR 189.

Disengage NOR 186 has three inputs, each of which has to be low in order to switch the NOR output to a high pressure. These inputs are the absence of a C3 index signal, the low presure Index timing signal I*l* and signal A3 (FIG. 12*a*) from Write Mode Latch 170 indicating the apparatus is in the Write Mode. Since signal A3 is present in the Write Mode and the Index timing signal I*l* regularly recurs, NOR 186 switches to a high output each time the index signal C3 does not exist. The high output is fed to NOR 190 causing, in turn, a low output that is supplied to NOR 189 of Index Latch 187. With the occurrence of a low timing signal I*l* therewith, the Index Latch is reset. The signal pressure levels from the two latch outptus to the clutch then reverse so that the Geneva clutch is disengaged. In summary, the clutch mechanism is engaged by the occurrence of each C3 signal and disengaged by the termination of that signal when the apparatus is in the Write Mode. This circuit limits the advance of tape to one increment or character position. The C3 signal.

The data input, strobing, and synchronizing circuits are shown in FIG. 12*c*. Generally, these circuits respond Index Latch is, in effect, automatically reset after each to the input signals from the electric-to-fluid transducers by generating a strobe signal to gate temporary storage latches for the data signals and synchronize the transmission of stored signals with the recording pin actuation. Input data may be either in the form of electrical or fluid pressure signals and is usually generated at a keyboard (not shown) or is transmitted from a telephone communication line. Since input data to the storage apparatus must be in the form of fluid pressure signals, electrical-to-fluids (*E/F*) transducers 200 are required if electrical signals are generated.

An example of such a transducer is shown in FIG. 14. An electrical signal applied to solenoid coil 201 attracts armature 202 upward and lifts rubber pad 203 to vent duct 204 to the atmosphere. Fluid at the supply pressure P*s* is continuously applied to manifold 205. When duct 204 is opened, the pressure therein drops to approximately atmospheric and produces a low pressure output indicating a data signal. De-energization of the coil closes the duct and restores duct pressure to that of the supply.

Referring now to FIG. 12*c*, an *E/F* transducer 200 is provided for each tape channel. No encoding apparatus for changing input characters into the tape code is shown since encoding devices are well-known. Each of the eight tape channels is identical and each is connected at its output to a corresponding recording pin duct 49 in FIG. 1. Assuming that Channel 8 produces an input signal of low pressure by its *E/F* transducer 200, NAND 206 switches to a high output signal. This output is supplied through volume Delay 207 directly to hysteresis latch 208, and is also inverted at NOR 209 so that a low level signal is also presented to latch 208 through Delay 210. However, it will be noted that the signals from Delays 207 and 210 will be of no effect at the control chambers for hysteresis latch 208 until gated by another signal at either of the AND arrangements.

An input data signal, when presented to NAND 206, can proceed no farther through the circuitry than to the hysteresis latch 208 until a strobe pulse is produced to gate and set the latch. The storage apparatus is arranged to function in this manner because of the variation between keyboard speed and machine cycle time, and because the keyboard may sit idle for long periods of time relative to the machine cycles. Therefore, when an input data signal occurs, a strobe pulse is produced to initiate operation of the buffer storage hysteresis latches and to start operation of a synchronizing circuit to synchronize the storage of data ultimately with the internal timing of the machine.

Referring once again to NAND 206, it will be seen that a high pressure output resulting from an input data pulse is supplied to a control chamber of NOR 211. In actuality a pair of NOR's 211 and 211*a* are used in order to provide a sufficient number of control chambers for the eight channels shown in this embodiment. This is due merely to the limited capacity of a single NOR as to the number of control chambers that can be used in a single element. Thus, when a high pressure signal occurs on one of the input chambers to NOR's 211 or 211*a*, a low pressure output signal is produced that is applied to a control chamber of NOR 212. Normally NOR 212 is producing a low output which is switched to a high output upon the receipt of a signal from either NOR 211 or 211*a*. The output of the latter NOR's is also fed to NAND 213 so that any low pressure input signal to the NAND causes it to switch to a high level output which is supplied to NOR 212 through Delay 214. The signal from NAND 213, after a predetermined delay, merely serves to limit the signal duration from NOR 212 by resetting the NOR and causing its output to again return to the low level. It will be seen that only one high pressure pulse can be produced from NOR 212 irrespective of how long the input to NOR's 211 or 211*a* exists. The high pressure pulse from NOR 212 is supplied to three different elements. One element is Inverter 215 so that a low pressure signal is supplied to Delay 216 which is again inverted at 217, resulting in a high pressure pulse that is supplied to the remaining pair of control chambers at hysteresis latch 208 of the one character memory. Since the upper AND arrangement of control chambers at the hysteresis latch now have concurrent high pressure signals thereon, the hysteresis latch is set so that its output is a high pressure signal to a control chamber of hysteresis latch 218. It will be noted that the signal from NAND 206 passes through a Delay 207 and that another signal from NAND 206 must pass through NOR 211, NOR 212, Inverter 215, Delay 216 and Inverter 217. Thus the Delay 207 is sufficiently long to apply the high pressure at hysteresis latch 208 at approximately the same time the signal is applied from Inverter 217. It will be recalled that the operation of hysteresis latches 208 and 218 is described with regard to FIG. 10 above.

Hysteresis latch 208 is not reset until the following two conditions are present concurrently; NOR 209 is producing a high output because no data signal has occurred on the corresponding line, and a subsequent strobe signal occurs from Inverter 217. If Channel 8 receives two successive data signals then latch 208 remains in the set condition; if Channel 8 receives no input signal while one or more channels do, then latch 208 for Channel 8 will be reset in that input cycle.

In order to set the second hysteresis latch 218, it must also be gated indirectly by a high level signal from the strobe circuit. A second high pressure output from NOR 212 is supplied through Delay 219 as an input to set hysteresis latch 220. This causes the latch to produce a low pressure output that is supplied to NOR 221. The remaining input to NOR 221, however, remains high until hysteresis latch 222 is also set, upon the occurrence of a high pressure signal from NAND 223. NAND 223 is activated by the synchronizer circuit, described below, thus indicating that the previous character has been processed. Up to this point, the input data signal has been transferred from hysteresis latch 208 of Channel 8 as a high level signal to one input control chamber of latch 218. The setting of data latch 218 cannot occur until NOR 221 produces a gating signal, and the gating signal occurs only when a signal is produced indicating that the recording mechanism is in synchronism to accept the data signal.

The third and last output taken from NOR 212 is applied as an input to NOR 225 to, in turn, produce a low pressure output that is applied to NAND 226. The NAND responds with the high pressure output that is applied to hysteresis latch 227 and to Delay 228. NOR 225 is returned to its normal low pressure output by the subsequent termination of the signal from Inverter 217 after the delay at 216.

The synchronizer circuit is that designated generally as 230, enclosed by the broken line. The purpose of the circuit is to synchronize the operation of data recording, the chad restore lever, and index advance with the recording mechanism which is continuously running. Mechanism timing pulses P of both high and low pressure are obtained from the recording mechanism and combined with the strobe signal from NAND 226 to produce gating signals for the output from each data channel Ch. 1–Ch. 8 to the recording pins, provide a C1 signal to actuate the restore lever, described above, with regard to FIG. 12*a*, and produce a C3 signal to initiate an advance of the index mechanism described above with regard to FIG. 12*b*.

At this time it will be noted that the data signal and strobe signal generated therefrom can occur randomly at any time relative to the recording mechanism cycle. Thus a strobe signal from NAND 226 may either combine readily with a timing signal P or be delayed slightly in the synchronizer circuit until a P signal occurs. The synchronizer circuit for combining the signals is similar to that described in the aforementioned U.S. patent application, Ser. No. 561,116 by H. R. Müller. When a high output signal from NAND 226 (FIG. 12*c*) is applied by hysteresis latch 227, the latch will be set only if a timing signal P*h* is concurrently present. Assuming concurrence, the latch output switches low and is applied to NAND 231, Inverter 232 and NAND 233. NAND 231 will switch to a high output because the output from Inverter 232 through Delay 234 is coincidentally low. Inverter 232 goes high as soon as latch 227 switched, but Delay 234 prevents immediate closure of the control chamber at NAND 231. The normal output from NAND 233 is high because the input thereto is low in the absence of a high output from NAND 226. As soon as the low output from latch 227 occurs, this assures that one of the parallel control chambers of NAND 233 will stay open thereby blocking the effect of the delayed high pressure signal when it arrives from Delay 228.

When NAND 231 switches, its high pressure output is fed to NOR 240 and to NAND 235. The low feedback signal of NAND 235 maintains NAND 231 at the high pressure output. The high level output from NAND 231 continues until it coincides with a high level delayed timing signal P*hd* at NAND 236. NAND 236 then switches to a low level output supplied through Delay 237 to reset latch NAND 235 and consequently reset NAND 236. The high output from Inverter 232 has already blocked the effect of latch 227 at NAND 231 and resets the latch after the period of delay at 234.

Now consider the effect of a lack of timing signal coincidence to set latch 227. If the latch was not set at the occurrence of a high level signal from NAND 226, then, after a delay at 228, the signal is applied at NAND 233 in coincidence with a high level from latch 227. Coincident signals switch NAND 228 so that it produces a low output through Delay 238 to set NAND 231 in the same manner as just described. NAND 231 remains set until reset by a signal from NAND 236. Thus an output signal from NAND 226 is supplied along two paths, either one of which will switch NAND 231. Note, however, that a signal by the second path is delayed at 228 and at 238 which together approximate the time between two successive timing signals P*h*.

When a high pressure synchronizing signal is produced from NAND 231 of synchronizing circuit 230, the signal is applied to a single shot composed of NOR 240 and NOR 250. Upon the occurrence of a delayed high level timing signal P*hd*, NOR 240 switches and provides a low output distributed to four locations, one of which is signal C1. C1, it will be recalled, is supplied to reset Initiation Latch 162 and set Restore Single Shot 173, both in FIG. 12*a*. When in the Write Mode, only the first signal C1 is effective to reset the Initiation Latch and all succeeding signals thereafter are ineffective.

The low level signal from NOR 240, in addition to switching NAND, 223, also opens control chamber 243 of NAND 244. When latch 218 is set by two high level signals, it produces a low level output at control chamber 245 so that NAND 244 will provide a high pressure output signal at terminal 246–8. This output signal acts on diaphragm 47 of recording pin 20 (FIG. 1) for the Channel 8 position on the tape to push a chad down. The high output from NAND 244 (FIG. 12*c*), in addition to actuating the recording pin, also switches NAND 247 which provides a timed low pressure feedback signal to maintain NAND 244 in the switched condition. NAND 247 has a timed reset feedback to itself through Delay 248 to eventually terminate the data signal supplied to the recording pin.

Returning now to NOR 240, a third low pressure output signal is supplied to change the output of NOR 250 to a high pressure feedback and maintain NOR 240 in the switched condition. NOR 250 also has an individual timed feedback through Delay 251 for reset that eventually returns NOR 250 to its usual low pressure output and effects a return of NOR to a normal high pressure.

Another low output from NAND 240 (FIG. 12*c*) is used to switch NAND 223 from a low to high output for a given time interval determined by Delay 256. The high output from NAND 223 resets hysteresis latch 218, the output of which was just processed, and sets hysteresis latch 222 which provides a low output to condition NOR 221 so that the latter provides a high level output in case latch 220 has been set by another strobe pulse from NOR 212. This high signal then gates the setting of latch 218 with the high signal from latch 208 so that the input data signal is available for processing on the next machine cycle. The other output path from NOR 221 passes through Delay 242 and resets both hysteresis latches 220 and 222 to low level outputs. Note that latch 218 is reset by the high signal from NAND 223 immediately prior to setting by the gate signal from NOR 221.

A fourth and last low output from NOR 240 is applied via Delay 252 to set Advance Latch 253 and activate the index circuit of FIG. 12*b* to thereby increment the tape one character position in the next cycle. When latch 253 is set, a high output signal C3 is fed through Delay 254 to both Engage NOR 185 and Disengage NOR 186 of FIG. 12*b*. Advance Latch 253 is reset by delayed index timing signals I1 at the second NAND circuit in the latch. A high C3 signal is taken from the second NAND to NAND 191 (FIG. 12*b*) when Latch 253 is off.

As a summary of the circuit in FIG. 12*c*, an input data signal may occur at one or more channel inputs at any time and initiate a sequence of events which ultimately results in actuating the recording mechanism and then the index mechanism when the storage apparatus is in the Write Mode. An input data signal is essentially moved from latch 208 to latch 218 and to NAND 244. This sequence, however, is controlled by the requirement of a strobe signal generated from the occurrence of an input data signal at NOR's 211 and 211*a*, NOR 212, Inverters 215 and 217 to gate the input signal to first latch 208. The strobe signal from NOR 212 starts operation of circuit 230 to synchronize the progression of the input data signal with the continuously operating mechanism. Latches 220 and 222 insure that a strobe signal and synchronizing signal have been produced before the data signal moves to latch 218 and then to NAND 244, indicating that the previous data signal was processed.

Interlock signals A3 and A4 from Write Mode Latch 170 (FIG. 12*a*) insure that the apparatus is in the Write Mode before data can be entered and the mechanism incremented. Referring to FIG. 12*c*, it will be noted that signal A4 from latch 170 is applied to a control chamber of NOR 212. When in the Write Mode, signal A4 is low and permits NOR 212 to be operated to produce a strobe signal. In FIG. 12*b*, it will be noted that low signal A3 from latch 170 is applied to Disengage NOR 186 to permit high level signal C3 to control the tape advance to produce single increments. Thus only one increment of advance occurs for each recorded character. With regard to FIG. 12*c*, there is provision for entering an SOM (A2) signal at latch 218 from Double Single Shot 167 in FIG. 12*a*. The SOM signal can set data hysteresis latch 218 without the necessity of a strobe or synchronizing signal because the machine is being started in the Write Mode. It will be recalled that the SOM signal is directed to latch 218 of only those channels selected to record the desired tape code character indicating Start-of-Message.

Tape incrementing that is necessary when entering the Write Mode is done by applying the low pressure signal A1 from the Double Single Shot 167 of FIG. 12*a* to NAND 226 of FIG. 12*c* at the input to the synchronizing circuit. Signal A2 initiates operation of the synchronizer circuit 230 which ultimately provides the C1 restore and C3 advance signals.

At the conclusion of data entry, an EOM (End of Message) key is depressed which produces data signals on selected channels in the desired code. An EOM detector is connected through each channel to either the primary signal path from NAND 206 in FIG. 12*c*, or to the inverted signal path at Inverter 209. Upon detecting the EOM code, a signal is applied to reset Write Mode Latch 170 in FIG. 12*a* so that signals A3 and A4 go high to block Disengage NOR 186 and strobe NOR 212. A circuit suitable for a detection circuit will be described below with reference to FIG. 13.

When the EOM signal is applied to the selected channel inputs, that signal is treated after detection as any other data input signal in FIG. 12*c*. That is, a last strobe signal via NOR's 211 and 211*a* will be produced, a signal from synchronizing circuit 230 will be produced, the EOM signal will advance through latch 208, 218 and 244, a C1 restore lever signal from NOR 240 will be generated, and a C3 advance signal will issue from Advance Latch 253. The result is that the restore lever 19 is operated, recording pins 20 (FIG. 2) are actuated on corresponding channels and the tape is incremented. However, because Write Mode Latch 170 of FIG. 12*a* is reset by the EOM signal applied to NOR 266, the latch output A3 is now high at Disengage NOR 186 (FIG. 12*b*) to prevent the generation of a signal to reset Index Latch 187. The indexing clutch remains engaged until disengaged by the subsequent detection of the SOM character at the read head. A detected SOM character provides a high pressure signal that is applied to NAND 191 to produce a low output. The low output operates in conjunction with the next indexing timing signal I*l* at NAND 189 of the Index Latch to reset the latch and stop the tape. The low output also sets Ready Latch 267 (FIG. 12*b*) to indicate that the machine can again be placed in any one of the operating modes. The tape is thus automatically homed at the occurrence of an EOM signal so that data readout can now take place.

Ready Latch 267 is provided to generate a signal to the machine operator indicating that the storage apparatus is in condition to enter one of the operating modes. The latch is set by a low signal from NAND 191 which occurs either when the SOM character has been detected, indicating the tape has been homed, or when the SOE (Start-of-Erase) character has been detected, indicating that tape erasure is complete, and low signal A6 (from FIG. 12*a*) is present indicating the machine has completed the Erase Mode. The latch is also set when power is turned on for the machine by an inverted fluid supply pressure signal indicating that the supply pressure is sufficient for operation. The provision of reset signals when starting is automatic. When the latch is set, the output of NAND 268 goes high and, because other inputs to NAND 269 are also high, NAND 269 then switches to a low output. The low output maintains the latch on by a feedback to NAND 268 and the low output may be fed through an inverter (not shown) to a pneumatic-to-electric transducer to operate a "Ready" light at the control panel.

Ready Latch 267 is reset by any of the low pressure signals A5 (from 12*a*), D1 (from FIG. 12*d*), and the output of Home Latch 262. These signals indicate the apparatus is respectively in either the Write, Read or Home Modes. Signal R*l*, and R*h* where used, is the standard initial reset signal. A reset signal is present when the supply pressure falls below a given value or when a Reset key is pushed down. When latch 267 goes off, the "Ready" light is extinguished.

In the event that the SOM character is detected while the machine is in the Write Mode, the coincidence of the Write Mode latch and SOM signals can be used to actuate a warning light that tape capacity is limited. This allows the operator to terminate the message before destroying the message by overwriting.

(B) Home Mode

The recording apparatus can be operated to automatically position a newly installed tape at the SOM character thereon. When a recorded tape is installed, the location of the SOM character is unknown because the tape may have been moved within its cassette during handling. Operation in the Home Mode merely engages the indexing mechanism until the sensing mechanism detects the SOM character and stops further movement.

After the tape and cassette have been positioned on the apparatus, Home key 260 (FIG. 12*b*) is depressed providing a low pressure signal directly to NAND 261 to set Home Latch 262. The low key signal also goes to Inverter 263 so that a high signal is eventually supplied through Delay 264 to terminate the input signal at NAND 261. When latch 262 is set, one high level signal is supplied to NAND 265 and a feedback maintains the latch set. A second high output from NAND 261 is supplied to Engage NOR 185 to, in turn, set Index Latch 187 when a coincident index timing signal I*l* occurs. The Geneva clutch is then engaged and the tape is incrementally advanced. A third output signal B1 is supplied to NOR 266 of FIG. 12*a* to produce a low pressure signal therefrom which resets Write Mode Latch 170, if not already reset. When latch 170 is reset, signals A3 and A4 change to a high level. Signal A3 is supplied to block Disengage NOR 186 (FIG. 12*b*) so that the clutch continuously increments. Signal A4, being high, also blocks NOR 212 (FIG. 12*c*) so that it generates a low output that prevents entry of further data, if attempted. Indexing continues until the SOM character in the tape is sensed in a detection circuit. At that time, the output from the detection circuit is high and aplied to NAND 191 of FIG. 12*b*. Signal $\overline{C3}$ is already high because the Advance Latch 253 of FIG. 12*c* is not set. The output of NAND 191 (FIG. 12*b*) goes low and, in conjunction with a concurrent index timing signal I*l*, will reset Index Latch 187. The transmission of the SOM detection signal to NAND 191 is arranged so that it is delayed sufficiently to allow the index mechanism to move the SOM character one position beyond the read head before stopping the tape.

(C) Read Mode

When a recorded tape is in position to be read out, the apparatus can be placed in the Read Mode. The control circuit for this mode is shown in FIG. 12*d*. Upon depression of the Read key 270, a low level signal is applied to NOR 271. Other inputs to NOR 271 may be included, such as the input from a transducer to indicate that the tape is in position; if not position, then the transducer would provide a high signal to block the effect of the Read Mode switch. When NOR 271 switches, its output goes high and is applied directly to Read Latch 272. Another output passes through Delay 273 to NOR 275 which is continuously receiving high level index timing signals I*h*. The Read Latch can be set only when the inputs from NOR 271 and NOR 275 are both high, but the output of NOR 275 is high only when both of its inputs are low.

The arrangement of Delay 273 and NOR 275 (single shot) insures that for one depression of the Read key for any length of time, the Read Latch will be set only once. Since a tape message may be short and the Read Latch is reset by the EOM character, a long depression of the Read key could result in again setting the latch. Delay 273 is greater than the pulse length of an index timing signal I*h*, so that, upon initiation of the Read Mode, NOR 275 will product at least one high output signal at latch 272 concurrently with the high input from NOR 271 to set the latch. It will be further noted that each index I*h* signal produces a low signal at the latch so that the latch must be set only between these timing signals and thus be operable at the beginning of a following I*h* signal to ensure reliable indexing. When Read Latch 272 is set, its output goes low and is supplied to four locations. One signal D1 is applied to reset Ready Latch 267 (FIG. 12*b*) indicating that the apparatus is now set in an operating mode. A second low signal is supplied to NAND 276 (FIG. 12*d*) of Read Single Shot 277. A third low output conditions NOR 278 for operation when the apparatus is in the Read Mode. The fourth low output is supplied to condition NOR 290 for producing a Disengage signal D3 when necessary.

When a low level input signal is applied to NAND 276 concurrently with a low level index timing signal I*l*, the NAND switches to produce a high pressure output. (The third input to NAND 276 may be assumed to also be low at this time.) The high output from NAND 276 is applied to NAND 279 which produces, in turn, the low level feedback signal to NAND 276 and also a feedback signal through Delay 280 to reset itself to thereby effect a resetting of NAND 279. This arrangement provides a single shot function. When NAND 279 switches to a low output, the output is also used as a gate signal for each of the NOR's 281–1 through 281–8, each corresponding to one of the tape channels. The other input to each of the NOR's 281–1 through 281–8 is supplied from a corresponding channel Inverter 282–1 through 282–8. The input signals to each inverter comes from a duct 30 (FIG. 3*a*) of a respective tape channel. Thus as shown in FIG. 3*b*, if a tape chad is free to move above the tape the pressure in channel 30 will be low, and if the chad lies below the tape indicating a data signal, the pressure in channel 30 will be high. When a high pressure signal from channel 30 is thus applied to an inverter such as 282–1 in FIG. 12*d*, the inverter output will be a low pressure signal that is supplied to NOR 281–1. Upon coincidence between the Single Shot and Inverter low level signals, NOR 281–1 will provide a high level signal to an encoder. The low level gating signal from Single Shot 277 is supplied to the NOR's for each channel output so that all channels are read concurrently for a single character position on the tape. These output signals may then be supplied to an encoder 283 and, if desired, the signals can further be supplied to fluid-to-electric transducers such as shown in FIG. 15 and described hereinafter.

Tape indexing is started immediately upon switching Read Latch 272 to the low level output which was supplied to NOR 278, unless an Interrupt Latch is used. The remaining input to NOR 278 is supplied from Interrupt Latch 285. The provision of an Interrupt Latch is optional and is used when the output signals read from the tape are to be transmitted to a device such as a printer. In that case, the readout of the tape must be under the control of the printer and does not occur until a ready signal is received from the printer. The Interrupt Latch serves this purpose.

Assume, for example, that the printer is indicating a "Ready" state by a high pressure level at terminal 286. The high level signal is supplied directly to a control chamber at NAND 289 to block the chamber and is supplied to Inverter 287 to produce a low pressure output to a control chamber at NAND 288. High pressure index timing signals I*h* are also supplied to the control chambers in series with those chambers just mentioned, and, when an index timing signal terminates, the two low pressure inputs permit NAND 288 to produce a high pressure output that is supplied to NAND 289. The output NAND 289 goes low and is supplied to two locations in addition to being fed back to NAND 288. One low output is supplied to gate NAND 276 as mentioned above. The remaining low output is supplied to NOR 278 which is conditioned by the low level signal from Read Latch 272. NOR 278 is now fully conditioned and produces a high level output signal D2 to Engage NOR 185 of FIG. 12*b*. NOR 185 sets Index Latch 187 at the next coincident index timing signal I*l*. The Index Latch engages the Geneva clutch and continuously indexes the tape past the read head.

However, the printer may indicate a "Not Ready" condition after reading out a character by signaling a low pressure pulse at terminal 286. The low pressure signal applied at Inverter 287 results in changing the status of NAND 289 so that it produces a high level output to NAND 288 as soon as the indexing period is over with the resultant feedback of a low pressure signal to NAND 289. The low level output from NAND 288 is supplied to NOR 290 and, in conjunction with the low level output from Read Latch 272, the NOR is conditioned to provide a high level output signal D3 to NOR 190 (FIG. 12*b*) which resets the Index Latch 187 and stops further indexing of the tape. Interrupt Latch 285 thus provides a control over the indexing of the tape during readout. Reading of the tape otherwise continues until Read Latch 272 is reset by an EOM signal from a detection circuit to thereby terminate further reading of the tape. As soon as latch 272 is reset, its outputs go high to block any further production of pulses from Read Single Shot 277, unblock the Ready Latch at 267, and block NOR's 278 and 290 to terminate further engage and disengage signals. Tape indexing continues, however, since Index Latch 187 (FIG. 12*b*) is set and no further disengage signals can be produced. Indexing stops upon detecting an SOM character at NAND 191, as described above in the Write Mode.

(D) Erase Mode

The storage apparatus is provided with the feature of being able to reset or erase the entire tape. The erase mode can be entered while the mechanism is already in the Write or Read Mode. When erasure is desired, Erase key 300 in FIG. 12*a* is depressed which provides a low pressure signal to Inverter 301 and to Delay 302. The Inverter produces a high output to switch NAND 303 to a low output and, after a predetermined delay, a low signal appears from Delay 302 to again change NAND 303 to a high output. This arrangement assures a one timed signal from NAND 303 regardless of the time key 300 is held depressed.

When the storage apparatus is not in any other mode, the low signal from NAND 303 is applied to Initiation Latch 162 and, since control chamber 163 is open, the latch will be set to start operation initially similar to the Write Mode, as described above. That is, an output of the left NAND of latch 162 actuates Double Single Shot 167 which provides first a signal A1 to the synchronizer circuit 230 of FIG. 12*c* to produce, in turn, actuating signals for the restore lever and a reset for the Initiation Latch 162 and an index signal for the Geneva clutch. Double Single Shot 167 (FIG. 12*a*) then provides signals A2 which are supplied to latch 218 of FIG. 12*c* to enter the SOM character in the tape. Restore Single Shot 173 of FIG. 12*a* is operated again and the tape is advanced one position. Write Mode Latch 170 is set in the usual manner so that it supplies a blocking high signal to control chamber 163 of Initiation Latch 162.

The erase signal from NAND 303 is also applied to set Erase Latch I 304 so that it provides a high pressure output signal that is distributed to four locations. One high signal is directed through Delay 307 to NAND 308; a second high signal is directed to NAND 306 to provide the latching feedback for NAND 305; a third signal is applied to set Erase Latch II 309, and the fourth signal A7 is supplied to reset Read Latch 272 if the machine was in the Read Mode. As soon as Erase Latch II is set, its output goes low to maintain Restore Single Shot 173 so that a continuous signal is applied to activate restore lever 19 of FIG. 2. The output of latch 309 is also fed to Inverter 310 so that a high output is supplied through Delay 311 to block NAND 305 and prevent another actuation of Erase Latch I. Output A6 from Inverter 310 blocks the setting of Ready Latch 267 (FIG. 12*b*) until the detection of the SOE character at the end of the Erase Mode.

The high signal to NAND 308, from latch 304, is combined with the output signal from the right-hand NAND of Initiation Latch 162, which is high after being reset by signal C1, which means that the write initiation is ended. After passing Delay 312, two control chambers of NAND 308 are then closed and, upon the occurrence of a high timing signal P*h* from Delay 313, the NAND will provide a low output to three locations. One output resets Write Mode Latch 170 after a delay which is long enough to insure that the SOE character has been entered at NAND 206 and produced a strobe pulse. The output from Latch 170 blocks Disengage NOR 186 (FIG. 12*b*) and blocks the generation of strobe signals from NOR 212 (FIG. 12*c*). Since the Index latch cannot be reset due to Disengage NOR 186 (FIG. 12*b*) being blocked by signal A3, indexing and chad restoring continue until the SOE character is deteced. A second output from NAND 308 (FIG. 12*a*) resets Erase Latch I 304 through Delay 314. Latch 309, however, continues to remain set. The third output from NAND 308 is supplied as a Start-of-Erase (SOE) character to selected channels at NAND 206 (FIG. 12*c*) to write the special character in the tape.

Indexing stops when the SOE detection circuit provides a high pressure signal to NAND 191 (FIG. 12*b*) in conjunction with signal $\overline{C3}$ which is also high. NAND 191 then resets Index Latch 187 and the Geneva clutch disengages. The operation of the restore lever is terminated by the SOE detector signal resetting Erase Latch II 309 to the high output condition so that Restore Single Shot 173 is blocked.

In the event that the Erase key 300 is depressed when the machine is already in the Write Mode, the low lovel erase signal from NAND 303 (FIG. 12*a*) is ineffective to set Initiation Latch 162 because control chamber 163 is already blocked. Instead, the erase signal merely sets Erase Latch I 304 and the high outputs from NAND 305 perform in the same manner as just described. That is, Erase Latch II 309 is set to provide a signal to the Restore Single Shot, and NAND 308 is switched to provide its low output signals which reset Write Mode Latch 170, supply the SOE character input to the channels, and reset Erase Lath I. As before, resetting and indexing occur until the SOE detection circuit provides termination signals for the erase operation after the tape has returned to the SOE character.

(E) Detection circuit

An example of a detection circuit that is suitable for use in detecting SOM, EOM, and SOE character signals is shown in FIG. 13. The circuit uses diaphragm control chambers as in the circuit described above to achieve the logic function desired. For example, the circuit may be used to detect an SOM character represented by chads being set in channels 1, 2 and 8 and not set in the remaining channels. The channels set will provide low pressure output signals from their respective sensing inverters 282 (FIG. 12*d*) and will be connected as shown to control chambers 320. Since only three channels are set for the SOM character, control chambers 321 are not required and remain at the low input level. Thus when the condition is sensed where inputs 1, 2 and 8 are low, control chambers 322 are both closed and a high pressure signal closes chamber 323. Since channels 3–7 are not set, their output signals from the inverters are high and are supplied to control chambers 324 as shown. Chamber 325 is disconnected from the circuit. When chambers 323 and 324 are all closed, a low pressure output occurs from the NAND which opens chamber 326 of an amplifier so that a low pressure signal also opens chamber 327 of inverter 328. Chamber 329 is normally low so the inverter produces a high pressure output signal for utilization. However, chamber 330 is also opened with chamber 327 so as a high pressure signal is applied to chamber 329 through Delay 331 to eventually close chamber 329. The delay provides a predetermined output signal duration and then terminates the signal regardless of the duration of input signals to chambers 327 and 330. It will be seen, that by selectively connecting the channel inverters as desired, any particular character code can be detected and a signal generated which may be used for control purposes.

A transducer suitable for converting from fluid-to-electrical signals is shown in FIG. 15. The particular transducer shown is designed to independently handle two input fluid channels. The transducer comprises a nonconductive support member 340 having cavities 341 in which are mounted movable pistons 342. Flexible diaphragms 343 are secured over the pistons and to the support member by plates 344. Ducts 345 direct fluid pressure signals against the diaphragms to control piston motion. The pistons are each urged outwardly by a respective U-shaped contact spring 346 of conductive material each having one leg in contact with the common lead 347. When a low pressure fluid signal is applied at a duct 345, U-shaped contact 346 urges a piston outwardly and connects to close the circuit with a conductive lead 348 embedded in the support member 340. If, however, a high pressure fluid signal is applied at duct 345, then the piston moves inwardly to push the leg of the U-shaped contact away from the embedded lead 348 and open the circuit.

The storage apparatus is not restricted to operation with an endless tape loop, but can be modified for operation with single-use tape, such as paper tape. In this case the write mechanism is constructed as a tape punch to completely remove the chads in the character positions. Since the chads are removed in data positions, sensing logic during reading or detection must be modified to acknowledge a low pressure output signal from those positions punched as a data bit. There is no further requirement for an erase mode, nor for automatic homing upon sensing the EOM character during writing or reading. The homing function can be retained during reading for automatically advancing the tape from the installed position to the first SOM character, or from an EOM character to the following SOM character when multiple messages are placed on the same tape.

While the invention has been particularly shown and described with reference to a preferred embodiment thereof, it will be understood by those skilled in the art that the foregoing and other changes in form and details may be made therein without departing from the spirit and scope of the invention.

What is claimed is:

1. Fluid-actuated apparatus for storing randomly generated fluid pressure input data signals in conjunction with regularly recurring timing pulses comprising, in combination:
- buffer storage means for temporarily storing said input data signals, said buffer means being arranged to accept a said input data signal concurrently with a fluid pressure gating signal;
- gating signal means responsive to the pressure change in one of said input signals for generating a said gating signal;
- principal storage means for storing therein manifestations of said input data signals;
- cyclic recording means operable in response to actuating signals for recording said manifestations in said principal storage means from said buffer storage means and incrementally advancing said principal storage means to a new storage position; and
- synchronizing means responsive to the fluid pressure level of said gating signal for generating actuating signals for said recording means in conjunction with said timing pulses.

2. Apparatus as described in claim 1 wherein said synchronizing means includes at least one fluid pressure control device for generating said actuating signals.

3. Apparatus as described in claim 1 further including:
- means adjacent said principal storage means for sensing said manifestations and issuing a corresponding fluid pressure output signal for each manifestation; and
- selectively operable control means connected to said recording means for incrementally advancing said principal storage means when said sensing means is operable.

4. Apparatus as described in claim 1 further including:
- means operable in response to a fluid pressure erase signal for removing said manifestations from said storage means at selected storage positions; and
- operation initiation means connected with said gating signal means and said recording means for generating in response to a start signal, a pair of fluid pressure signals in sequence, the first of said pair being effective to actuate said erase means at one position and advance said principal storage means one position, and the second being effective to actuate said recording means for recording a special arrangement of manifestations in said erased position erasing another position and advancing said principal storage means one more position.

5. Apparatus as described in claim 4 further including means selectively operable in response to a predetermined pressure control signal for recording an arrangement of manifestations in said storage means indicating an end-of-message.

6. Apparatus as described in claim 5 further including means responsive to the application of said end-of-message signals for blocking the further receipt of said input signals.

7. Fluid-actuated apparatus for storing randomly generated fluid pressure input data signals in conjunction with regularly recurring timing pulses comprising, in combination:
- buffer storage means for temporarily storing said input data signals, said buffer storage means including a storage latch comprising flexible diaphragm valves responsive to fluid pressure for controlling fluid flow;
- fluid control means operable in response to the generation of said input signals for transferring said input signals to said buffer storage means;
- principal storage means adapted to have a plurality of manifestations recorded therein representative of said input data signals;
- cyclic, fluid-actuated recording means operable at predetermined times with relation to said timing pulses for recording said manifestations in said principal storage means in response to fluid signals applied thereto; and
- synchronizing means responsive to the operation of said control means and said timing pulses for applying said temporarily stored signals to said recording means at said predetermined times.

8. Fluid-actuated apparatus for storing manifestations of fluid pressure input signals representing a data message, comprising in combination:
- data storage means having a plurality of storage positions adapted to have said manifestations recorded therein and removed therefrom, said storage means being a chadless tape in which said data manifestations are indicated by the tape chads being on one side of the tape and the absence of manifestations is indicated by the chads being on the opposite side of said tape at said positions;

recording means located adjacent said storage means and operable in response to fluid pressure pulses applied thereto for recording corresponding manifestations thereof in said storage means;

erasure means located in advance of said recording means and operable in response to a fluid erase signal for removing any said manifestations in preselected ones of said storage positions, said erasure means including a selectively activatable member for moving any chads on said one side to said opposite side at each said storage position;

transport means operable in response to applied fluid advance signals for incrementally advancing said storage means past said erasure and recording means; and sequence control means interconnecting said erasure means, said transport means and said recording means and being selectively activatable to apply a said erase signal to said erasure means and an advance signal to said transport means, and thereafter to apply fluid signals to said recording means to record a start-of-message indication and a second advance signal to said transport means.

9. Apparatus as described in claim 8 wherein:

said recording means is cyclic and responsive to said input signals at a predetermined time each cycle; and said apparatus further includes synchronizing means responsive to said input signals for applying said input signals to recording means at said predetermined times.

10. In fluid-actuated apparatus for detecting data in a message recorded as manifestations on a record member, said message being defined by special manifestations indicating the start-of-message and end-of-message, the combination comprising:

transport means engageable for incrementally advancing said record member;

means for generating fluid pressure timing signals in synchronism with the movement of said member;

data sensing means controlled by said timing means for generating fluid pressure signals corresponding to each said manifestation;

first control means selectively operable to engage said transport means and responsive to said sensing means to disengage said transport means upon detecting said output signals indicating the presence of said start-of-message manifestation;

output means connected to said sensing means and operable to provide an output signal for each said fluid pressure signal from said sensing means;

second control means selectively operable after said first control means to engage said transport means and render said output means operable; and means responsive to said fluid pressure signals from said sensing means for suppressing said output means when said special end-of-message manifestation is detected.

11. Apparatus as described in claim 10 wherein said record member is an endless loop and said apparatus further includes:

means responsive to said detection of said special end-of-message manifestations for rendering said first control means operable.

12. In apparatus for sensing data in an endless record member with a plurality of storage positions adapted to have data manifestations recorded therein and removed therefrom, the combination comprising:

recording means operable in response to fluid pressure signals applied thereto for recording manifestations of said signals in said record member;

output means operable to sense said positions in said member and issue output signals corresponding to the manifestations therein;

erasure means selectively actuatable in response to a control signal thereto for removing said recorded manifestations in said positions;

transport means engageable for incrementally advancing said member past said erasure means;

control means operable to supply special fluid pressure start-of-erase signals to said recording means and a control signal to said erasure means;

means responsive to the operation of said recording means for engaging said transport means; and means responsive to a signal from said output means corresponding to said start-of-erase signal for disengaging said transport means.

References Cited

UNITED STATES PATENTS

| | | | |
|---|---|---|---|
| 2,782,305 | 2/1957 | Havens et al. | 250—27 |
| 3,017,610 | 1/1962 | Auerbach et al. | 340—172.5 |
| 3,151,314 | 9/1964 | Root et al. | 340—173 |
| 3,275,993 | 9/1966 | Bartlett et al. | 340—172.5 |
| 3,350,697 | 10/1967 | Hirvela | 340—172.5 |
| 3,351,917 | 11/1967 | Shimabukuro | 340—172.5 |

ROBERT C. BAILEY, Primary Examiner

RONALD F. CHAPURAN, Assistant Examiner

U.S. Cl. X.R.

235—201